(12) United States Patent
Dandie et al.

(10) Patent No.: US 9,858,777 B2
(45) Date of Patent: Jan. 2, 2018

(54) SYSTEM, METHOD AND COMPUTER READABLE MEDIUM FOR MANAGING MOBILE DEVICES

(71) Applicant: SensorMedia Inc., Mono (CA)

(72) Inventors: William J. Dandie, Toronto (CA); Dimitar Deyanov Kalendzhiev, Vaughan (CA)

(73) Assignee: SensorMedia Inc., Mono (CA)

( * ) Notice: Subject to any disclaimer, the term of this patent is extended or adjusted under 35 U.S.C. 154(b) by 22 days.

(21) Appl. No.: 14/773,682

(22) PCT Filed: Mar. 10, 2014

(86) PCT No.: PCT/CA2014/000212
§ 371 (c)(1),
(2) Date: Sep. 8, 2015

(87) PCT Pub. No.: WO2014/134718
PCT Pub. Date: Sep. 12, 2014

(65) Prior Publication Data
US 2016/0042620 A1    Feb. 11, 2016

Related U.S. Application Data

(60) Provisional application No. 61/774,870, filed on Mar. 8, 2013.

(51) Int. Cl.
G08B 13/14    (2006.01)
G06F 1/28    (2006.01)
(Continued)

(52) U.S. Cl.
CPC .......... G08B 13/1418 (2013.01); G06F 1/28 (2013.01); G06F 11/3013 (2013.01);
(Continued)

(58) Field of Classification Search
CPC ...... G06F 21/12; G06F 21/121; G06F 21/305; G06F 21/316; G06F 21/36; G06F 21/50;
(Continued)

(56) References Cited

U.S. PATENT DOCUMENTS

| 5,732,212 | A | * | 3/1998 | Perholtz | ................... | G06F 1/26 709/217 |
| 2005/0128083 | A1 | | 6/2005 | Puzio et al. | | |

(Continued)

OTHER PUBLICATIONS

International Search Report dated Jun. 11, 2014 from corresponding International Application No. PCT/CA2014/000212; 2 pgs.

*Primary Examiner* — Hongmin Fan
(74) *Attorney, Agent, or Firm* — Maier & Maier, PLLC

(57) ABSTRACT

A system, method and computer readable medium are for managing display devices using manager devices. A communication link is established between display subsystems and manager subsystems. Alarm conditions are detected and reported, and alarm events are triggered within the display devices. The display devices have restricted access to applications, settings, or networks. User-generated media is deleted from the display devices. When idle or when user activity is detected, audiovisual media is presented from the display devices. Powering of the display devices is regulated. Metrics and data associated with the display devices is collected.

42 Claims, 44 Drawing Sheets

(51) Int. Cl.
  *G06F 21/12*  (2013.01)
  *G06F 11/34*  (2006.01)
  *G06F 21/88*  (2013.01)
  *G06Q 30/00*  (2012.01)
  *G06Q 50/32*  (2012.01)
  *H04W 4/00*  (2009.01)
  *G06F 21/31*  (2013.01)
  *G06F 21/55*  (2013.01)
  *H04L 12/24*  (2006.01)
  *G06Q 10/06*  (2012.01)
  *H04W 84/12*  (2009.01)
  *G06F 11/30*  (2006.01)
  *H04W 88/02*  (2009.01)
  *H04L 29/08*  (2006.01)
  *H04W 12/06*  (2009.01)
  *H04M 1/725*  (2006.01)
  *G06F 11/32*  (2006.01)

(52) U.S. Cl.
  CPC .......... *G06F 11/3058* (2013.01); *G06F 11/34* (2013.01); *G06F 11/3438* (2013.01); *G06F 21/12* (2013.01); *G06F 21/316* (2013.01); *G06F 21/552* (2013.01); *G06F 21/88* (2013.01); *G06Q 10/06* (2013.01); *G06Q 30/00* (2013.01); *G06Q 50/32* (2013.01); *H04L 41/0681* (2013.01); *H04L 41/0686* (2013.01); *H04L 41/22* (2013.01); *H04L 67/125* (2013.01); *H04W 4/008* (2013.01); *H04W 84/12* (2013.01); *G06F 11/3055* (2013.01); *G06F 11/324* (2013.01); *G06F 2201/86* (2013.01); *G08B 13/1409* (2013.01); *H04L 67/22* (2013.01); *H04M 1/7253* (2013.01); *H04W 12/06* (2013.01); *H04W 88/02* (2013.01)

(58) Field of Classification Search
  CPC ............ G06F 11/3006; G06F 11/3058; G06F 11/3438; G06F 11/324; G06F 1/28; G06F 21/84; G06F 21/88; G08B 13/14; H04L 67/22; H04L 41/06; H04L 41/0681
  See application file for complete search history.

(56) References Cited

U.S. PATENT DOCUMENTS

| | | | |
|---|---|---|---|
| 2006/0097875 | A1 | 5/2006 | Ott |
| 2006/0109101 | A1* | 5/2006 | Genda ................... G06F 21/35 340/521 |
| 2008/0178300 | A1* | 7/2008 | Brown ................ G06F 21/6218 726/29 |
| 2010/0204960 | A1* | 8/2010 | Hagadone ........... G06F 11/3006 702/188 |

* cited by examiner

Index of /m/android-current

| Name | Last modified | Size | Description |
|---|---|---|---|
| Parent Directory | | | |
| DS-Demo1.zip | 25-Jan-2013 12:26 | 59M | |
| SmartCircle-Client-RADO.apk | 29-Jan-2013 15:21 | 3.3M | |
| SmartCircle-Client.apk | 06-Feb-2013 16:57 | 3.3M | |
| SmartCircle-DS-Client.apk | 05-Feb-2013 16:10 | 292K | |
| SmartCircle-Manager.apk | 11-Feb-2013 17:31 | 445K | |

*Apache/2.2.15 (ClearOS Core) Server at 192.168.10.10 Port 80*

FIG. 8

SmartCircle app can run in Managed
or Standalone mode

SmartCircle app activates Admin mode on device

SmartCircle app Standalone mode activation

SmartCircle app Standalone mode

SYSTEM, METHOD AND COMPUTER READABLE MEDIUM FOR MANAGING MOBILE DEVICES

INTRODUCTION & BACKGROUND

There may be a need for a security product to aesthetically display and secure mobile devices (e.g., mobile communications devices), while maintaining a great customer experience. In the prior art, one or more detectable auto-positioning security sensors and/or mechanical locking claws may have been used to at least partially address one or more of these needs.

Still, there may be a need for a device management system, method and/or computer readable medium which better manages the mobile devices, helps to sell more devices, makes easier the job of sales staff, and/or decreases display costs. Similarly, there may be a need for a device management system, method and/or computer readable medium which may require zero hardware investment, and/or may be capable of use with proprietary and/or third party hardware, and/or require no additional hardware whatsoever. Such a security device management system, method and/or computer readable medium may preferably have little or no environmental impact, and may preferably have a sub-zero environmental impact, perhaps at least partially in the sense that it may reduce and/or eliminate the need for different systems to achieve security, monitoring, and/or digital media capabilities.

What may be needed is a device management system, method and/or computer readable medium that links one or more, and potentially all, of the mobile devices in a typical location. Preferably, such linkages may be characterized as: peer-to-peer; stable; scalable; two-way communication; wireless, e.g., over local area networks (LAN) and/or wide-area networks (WAN); using proprietary and/or third party hardware, and/or no hardware; affording links between various devices of the same and/or different types, e.g., Android, iOS, BB10, Windows devices; and/or affording links between various controller/display devices of fixed/mobile types.

There may be a need for a device management system, method and/or computer readable medium which: (1) secures the mobile devices; (2) protects the mobile devices; (3) enables media management functionality via the mobile devices; and/or (4) monitors the mobile devices.

In securing the mobile devices, there may be a need for a device management system, method and/or computer readable medium which may be: (a) customizable for multiple event triggers, e.g., SIM, power, headphone, and/or Wi-Fi connection irregularities which might, individually and/or collectively, indicate an alarm condition for one or more of the mobile devices; (b) customizable for one or more sounds, delays, and/or timing associated with the security features; and/or (c) adapted to reduce the number and/or frequency of false alarms generated.

In protecting the mobile devices, there may be a need for a device management system, method and/or computer readable medium which may: (a) restrict access to one or more applications (e.g., "Apps") and/or settings on the mobile devices, and/or to one or more connected networks; (b) delete unwanted photos, audio and/or video; (c) decrease technician time which may be required in setting up, managing and/or maintaining such protection; and/or (d) save more devices than might be saved otherwise.

In enabling kiosk and/or media management functionality (alternately hereinafter collectively or individually referred to as "media management functionality") via the mobile devices, there may be a need for a device management system, method and/or computer readable medium which may enable: (a) customized video on the mobile device at idle; (b) presentation of a new video when the mobile device is tapped; (c) presentation of a new video, or no video, when the mobile device is lifted; and/or (d) presentation of a video signal (e.g., from the mobile device) on one or more monitoring devices when the mobile device is lifted.

In monitoring the mobile devices, there may be a need for a device management system, method and/or computer readable medium which may: (a) determine which mobile devices are powering; (b) present an alert when one or more of the mobile devices are not powering; (c) regulate power going to one or more of the mobile devices, preferably as needed; and/or (d) collect metrics and/or data concerning mobile device lifts (e.g., for marketing, warranty, and/or other purposes), mobile device alarms (e.g., real and/or false), and/or other mobile device activity (e.g., photos).

There may be a need for a device management system, method and/or computer readable medium which works with easy to download software, functions on a software-as-a-service model, and/or affords an easy-to-login-and-begin user experience.

There may also be a need for a complete hardware and/or software "smart" solution which obviates and/or mitigates one or more of the various problems confronted in the prior art.

It is an object of the present invention to obviate or mitigate one or more of the disadvantages and/or shortcomings associated with the prior art, to provide one or more needs or advantages, and/or to achieve one or more objectives of the invention, all as may be readily appreciated by persons having ordinary skill in the art in full view of all the teachings and disclosures herein.

SUMMARY OF THE INVENTION

A system, method and computer readable medium are for managing display devices using manager devices. A communication link is established between display subsystems and manager subsystems. Alarm conditions are detected and reported, and alarm events are triggered within the display devices. The display devices have restricted access to applications, settings, or networks. User-generated media is deleted from the display devices. When idle or when user activity is detected, audiovisual media is presented from the display devices. Powering of the display devices is regulated. Metrics and data associated with the display devices is collected.

According to the invention, there is disclosed a system for managing one or more display devices including one or more mobile devices at an on-site location, using one or more manager devices at the on-site location and/or remotely located. The system includes one or more manager subsystems, each for execution by a respective one of the manager devices. The system also includes one or more display subsystems, each for execution by a respective one of the display devices. A two-way wireless communication link is established between the display subsystems and the manager subsystems. The display subsystems report to the manager subsystems one or more predetermined alarm conditions detected for at least a first one of the mobile devices. The manager subsystems enable one or more predetermined alarm events to be triggered within the display devices. The display subsystems restrict access to one or more applications or settings on the mobile devices, or to one or more connected networks. The manager subsystems and the display subsystems together enable deletion of user-generated audio, visual or audiovisual media from the mobile devices. When at least a second one of the mobile devices is at idle or when user activity is detected at said second one of the mobile devices, the display subsystems present predetermined audio, visual or audiovisual media from the display devices. The manager subsystems: determine which of the mobile devices are powering; present an alert when said one or more of the mobile devices are not powering; and regulate power going to said one or more of the mobile devices. The manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

According to the invention, there is also disclosed a method for managing one or more display devices including one or more mobile devices at an on-site location, using one or more manager devices at the on-site location and/or remotely located. The method includes a manager step of providing one or more manager subsystems, each for execution by a respective one of the manager devices. The method also includes a display step of providing one or more display subsystems, each for execution by a respective one of the display devices. A two-way wireless communication link is established between the display subsystems and the manager subsystems. The display subsystems report to the manager subsystems one or more predetermined alarm conditions detected for at least a first one of the mobile devices. The manager subsystems enable one or more predetermined alarm events to be triggered within the display devices. The display subsystems restrict access to one or more applications or settings on the mobile devices, or to one or more connected networks. The manager subsystems and the display subsystems together enable deletion of user-generated audio, visual or audiovisual media from the mobile devices. When at least a second one of the mobile devices is at idle or when user activity is detected at said second one of the mobile devices, the display subsystems present predetermined audio, visual or audiovisual media from the display devices. The manager subsystems: determine which of the mobile devices are powering; present an alert when said one or more of the mobile devices are not powering; and regulate power going to said one or more of the mobile devices. The manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

According to the invention, there is also disclosed a computer readable medium for managing one or more display devices having processors and including one or more mobile devices at an on-site location, using one or more manager devices at the on-site location and/or remotely located. The computer readable medium is use with one or more manager subsystems each for execution by a respective one of the manager devices. The computer readable medium includes executable instructions which are physically stored thereon and which, upon execution, encode the processors to perform a display step of providing one or more display subsystems, each for execution by a respective one of the display devices, wherein a two-way wireless communication link is established between the display subsystems and the manager subsystems. The display subsystems report to the manager subsystems one or more predetermined alarm conditions detected for at least a first one of the mobile devices, and the manager subsystems enable one or more predetermined alarm events to be triggered within the display devices. The display subsystems restrict access to one or more applications or settings on the mobile devices, or to one or more connected networks. The display subsystems, together with the manager subsystems, enable deletion of user-generated audio, visual or audiovisual media from the mobile devices. When at least a second one of the mobile devices is at idle or when user activity is detected at said second one of the mobile devices, the display subsystems present predetermined audio, visual or audiovisual media from the display devices. The display subsystems enable the manager subsystems to: determine which of the mobile devices are powering; present an alert when said one or more of the mobile devices are not powering; and regulate power going to said one or more of the mobile devices; and collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

According to the invention, there is also disclosed a computer readable medium for managing one or more display devices including one or more mobile devices at an on-site location, using one or more manager devices having processors at the on-site location and/or remotely located. The computer readable medium is for use with one or more display subsystems each for execution by a respective one of the display devices. The computer readable medium includes executable instructions which are physically stored thereon and which, upon execution, encode the processors to perform a manager step of providing one or more manager subsystems, each for execution by a respective one of the manager devices, wherein a two-way wireless communication link is established between the display subsystems and the manager subsystems. The manager subsystems enable the display subsystems to: report to the manager subsystems one or more predetermined alarm conditions detected for at least a first one of the mobile devices, and the manager subsystems enable one or more predetermined alarm events to be triggered within the display devices; restrict access to one or more applications or settings on the mobile devices, or to one or more connected networks; and, when at least a second one of the mobile devices is at idle or when user activity is detected at said second one of the mobile devices, present predetermined audio, visual or audiovisual media from the display devices. The manager subsystems, together with the display subsystems, enable deletion of user-generated audio, visual or audiovisual media from the mobile devices. The manager subsystems: determine which of the mobile devices are powering; present an alert when said one or more of the mobile devices are not powering; and regulate power going to said one or more of the mobile devices. The manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

Other advantages, features and/or characteristics of the present invention, as well as methods of operation and/or functions of the related elements of the system, method and computer readable medium, and/or the combination of steps, parts and/or economies of manufacture, will become more apparent upon consideration of the following detailed description and the appended claims with reference to the accompanying drawings.

BRIEF DESCRIPTION OF THE DRAWINGS

The novel features which are believed to be characteristic of the system, method and computer readable medium according to the present invention, as to their structure, organization, use, and/or method of operation, together with further objectives and/or advantages thereof, will be better understood from the accompanying drawings in which presently preferred embodiments of the invention will now be illustrated by way of example. It is expressly understood, however, that the drawings are for the purpose of illustration and description only, and are not intended as a definition of the limits of the invention.

FIG. 8 shows the manager and client/display apps of the device management system accessible via a URL and downloaded from the remote databases;

DETAILED DESCRIPTION OF PREFERRED EMBODIMENTS

Figure 1:
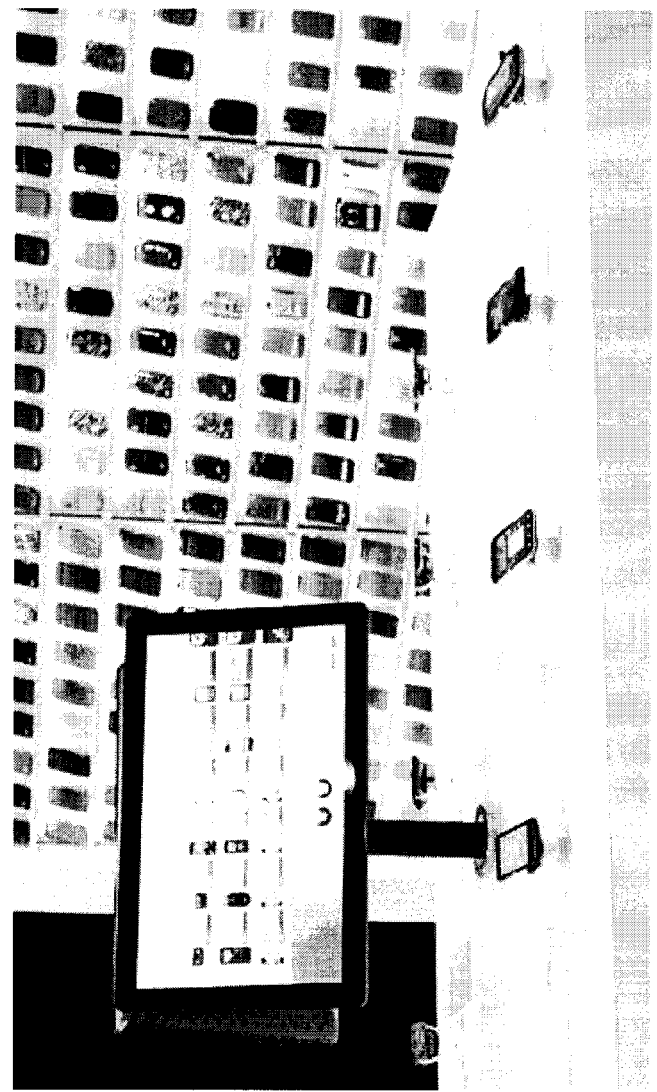
FIG. 1 shows a typical location for mobile communication devices where a device management system in accordance with an embodiment of the present invention may be deployed.

There may be provided an app-based device management system, method and/or computer readable medium according to the present invention (alternately hereinafter, simply the "security system" or "device management system"). The device management system may preferably use the intelligence of the mobile (display) devices themselves to secure, protect and/or monitor the mobile/display devices in many more ways than mechanical systems. Preferably at the same time, the device management system may trigger actions within mobile devices, such as video messages, so a control/managing user can send customers relevant messages (e.g., prices, deals, incentives) while such customers make their purchase decisions.

Preferably, the security system may establish wireless, real-time, two-way communication among control/manager devices (e.g., devices employees use to monitor the store) and client and/or display devices (alternately hereinafter collectively or individually referred to as the "display devices", e.g., mobile/display devices). One or more manager devices may preferably remotely monitor one or more display devices, and preferably every display device, in the store. This remote monitoring may help to readily identify problems with the display devices, such as, for example: theft attempts; charging issues; and/or Wi-Fi connection breakdowns. The device management system may preferably help the manager to take necessary and/or desirable steps to quickly resolve one or more of these problems, preferably without the customers knowing.

According to the invention, the device management system may preferably use one or more sensors in the display devices to trigger one or more actions. For example, removing a SIM card from a display device may preferably trigger an alarm in that display device, and/or in a manager device, to immediately alert store employees. In another example, lifting a display device may preferably trigger a marketing or other video in a nearby display device, preferably to aid in effectively communicating the marketing or other message.

The app(s) which may be preferably provided as part of the device management system may preferably work on all mobile devices and/or operating systems. For example, Blackberry, Windows, Android and/or iOS versions may preferably be available.

According to the invention, the device management system may preferably: (a) provide many alarm triggers, e.g., power, headphone, SIM card removal, and/or loss of Wi-Fi connection; (b) provide alarm alert options, e.g., display device, manager device, email, SMS; (c) monitor charging to ensure the display devices are always optimally powered; (d) limit access to display device settings, networks, and/or app downloads; (e) sweep display devices to delete unwanted photos and/or videos at regular intervals; (f) display promotional or other videos, URLs, and/or images from one or more of the display devices in various different states, e.g., idle, lifted, and/or touched states; and/or (g) collect data on battery, number of lifts, number of videos played, and/or number of alarms.

The device management system may preferably include and/or be adapted for use with a one or more apps that use the intelligence of the display devices to create a wireless, app-based communication and/or distribution system to secure, monitor, and/or display videos on the display devices in a retail store. It is preferably compatible with proprietary and/or third party hardware, and/or it may function as a stand-alone security system. It is preferably easy to download (e.g., available in app stores), configure and/or use. The device management system is preferably secure, stable and/or scalable (e.g., peer-to-peer).

The device management system is preferably two apps (e.g., manager and display system apps) that work together to create a communication link between manager and display devices. The manager devices, running the manager app, preferably monitor the display devices and/or can trigger an event within the display devices. The manager device may preferably stop triggered alarms within the display devices. The manager devices may preferably be alternately referred to herein as control and/or manager devices. The display devices, running the display system app, may preferably trigger events within the manager, e.g., status indicators, alarm alerts. Preferably, when one of the display devices is linked to one or more of the manager devices, it may present a custom screen saver, which may preferably stop when the display device is tapped and/or lifted. At that time, the display device may preferably be open and capable of use, albeit in a restricted/protected mode (as described elsewhere herein).

According to the invention, if certain predetermined alarm trigger conditions are met (e.g., due to a power cable disconnected, a SIM card removed, headphones removed, and/or a Wi-Fi connection lost), then an alert may preferably be triggered in the display device, manager device, and/or via email and/or SMS message.

The functioning of the manager app and/or device may preferably be configured within certain acceptable parameters, according to retail and/or manager preferences.

Preferably, according to one aspect of the invention, a stand-alone client/display app and/or device (alternately hereinafter collectively or individually referred to as the "display app and/or device") may be provided which is capable of functioning without communication with any manager app. The functioning of the display app and/or device may preferably be configured within certain acceptable parameters, according to retail and/or manager preferences.

FIG. 1 shows a typical location for mobile communications devices (e.g., a retail environment). According to one aspect of the invention, there may be provided a device, system, method and/or computer readable medium which may be useful in aesthetically displaying and securing mobile devices (e.g., mobile communications devices). The device, system, method and/or computer readable medium may preferably manage and monitor the mobile devices, including digital media/display capabilities.

Figure 2:
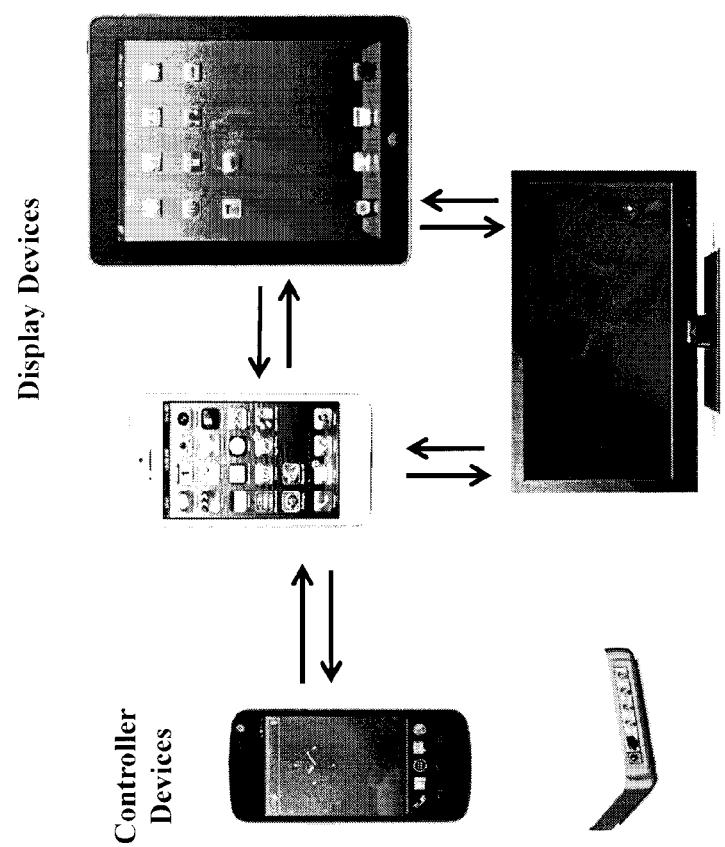
FIG. 2 shows a number of controller and display devices of fixed and mobile types in accordance with an embodiment of the present invention, which are linked in a retail environment.

FIG. 2 shows a number of controller and display devices of fixed and mobile types which—according to a preferred embodiment of the device, system, method and/or computer readable medium—are linked in a retail environment. The display devices are preferably mobile devices for retail. The controller devices, though they may be mobile devices, preferably are not for retail and/or only accessible by authorized personnel. The links between the controller and display devices in the location may preferably be peer-to-peer, stable and scalable, and/or afford two-way wireless communication (e.g., LAN, WAN) between various Android, iOS, BB10 and/or Windows devices.

Figure 3:
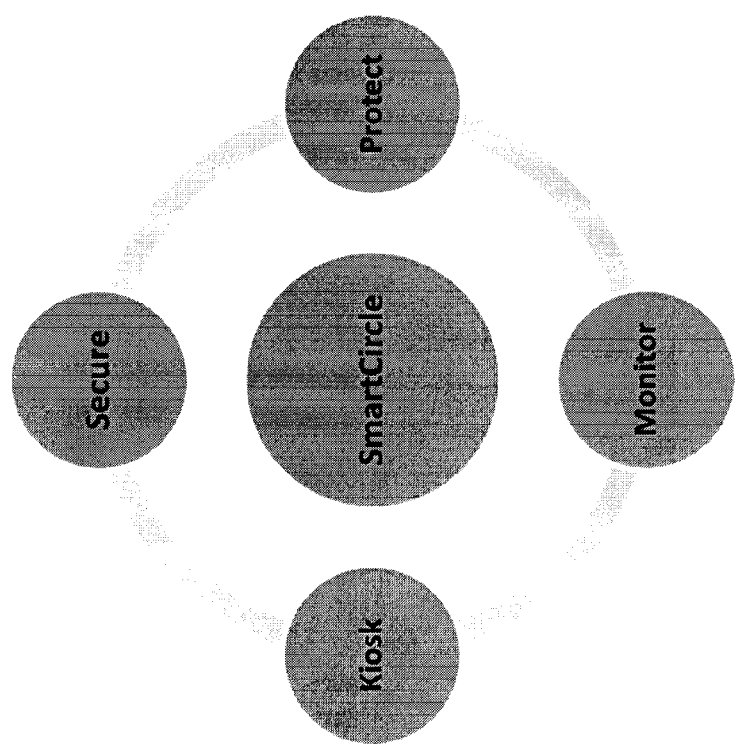
FIG. 3 shows securing, protecting, media management and/or monitoring features of a device management system in accordance with an embodiment of the present invention.
Figure 3A:
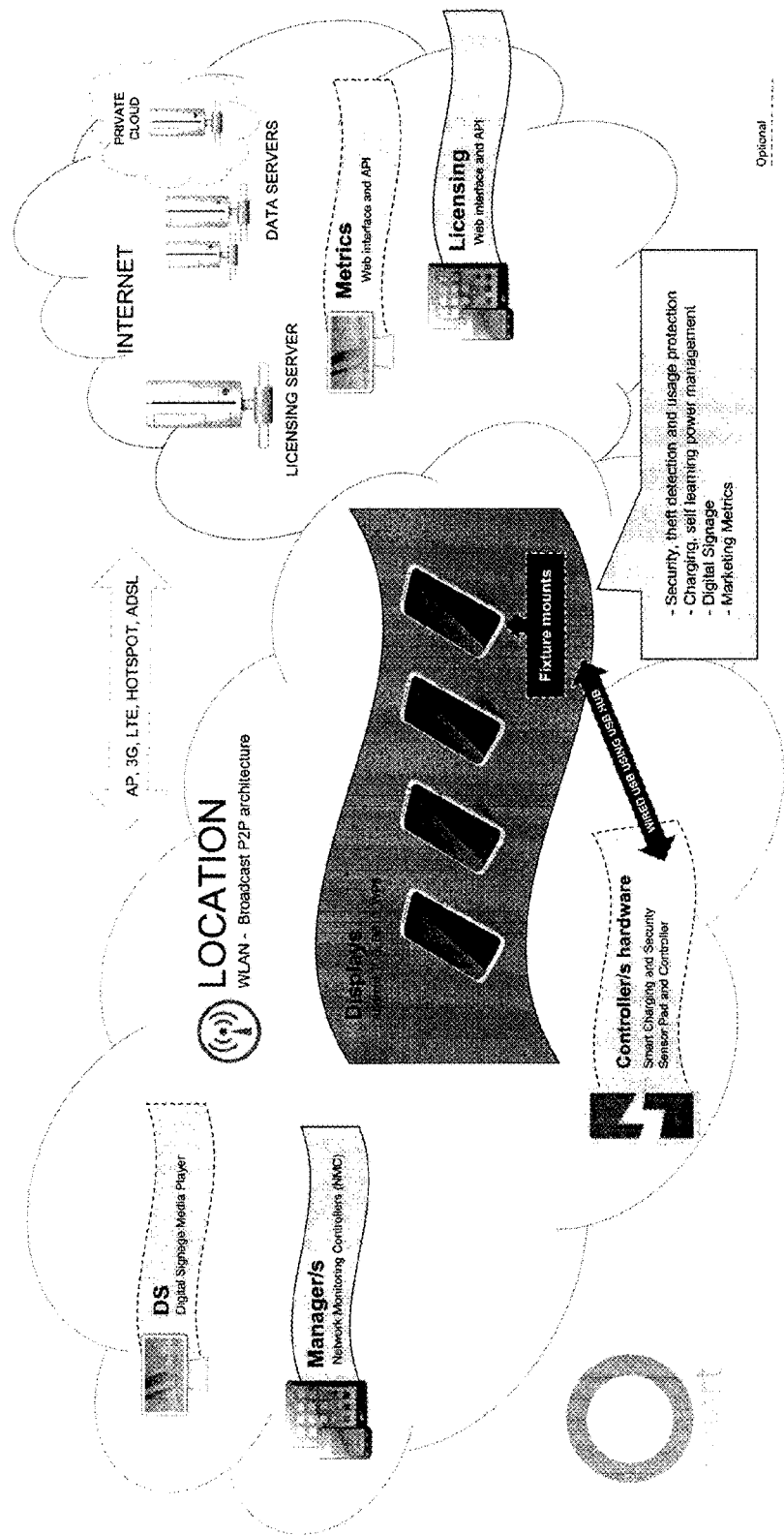

FIG. 3 illustrates securing, protecting, media management (e.g., kiosk) and/or monitoring features of the (Smart-Circle™) device management system, method and/or computer readable medium which may preferably be provided according to one or more aspects of the invention.

In securing the mobile devices, the device management system, method and/or computer readable medium according to the invention may be: (a) customizable for multiple event triggers, e.g., SIM, power, headphone, and/or Wi-Fi connection irregularities which might, individually and/or collectively, indicate an alarm condition for one or more of the mobile devices; (b) customizable for one or more sounds, delays, and/or timing associated with the security features; and/or (c) adapted to reduce the number and/or frequency of false alarms generated.

In protecting the mobile devices, the security device, system, method and/or computer readable medium according to the invention may: (a) restrict access to one or more applications (e.g., "Apps") and/or settings on the mobile devices, and/or to one or more connected networks; (b) delete unwanted photos, audio and/or video; (c) decrease technician time which may be required in setting up, managing and/or maintaining such protection; and/or (d) save more devices than might be saved otherwise.

In enabling media management functionality via the mobile devices, the security device, system, method and/or computer readable medium according to the invention may enable: (a) customized selectable media (e.g., video) on one or more of the mobile devices when idle; (b) presentation of a new selectable media on one or more of the mobile device when one or more of them is tapped; (c) presentation of a new selectable media, or no selectable media, on one or more of the mobile devices when lifted; and/or (d) presentation of a selectable media signal (e.g., from a lifted one or more of the mobile devices) on one or more monitoring devices when the mobile devices are lifted.

In monitoring the mobile devices, the device management, system, method and/or computer readable medium according to the invention may: (a) determine which mobile devices are being powered; (b) present an alert when one or more of the mobile devices is not being powered; (c) regulate power going to one or more of the mobile devices, preferably as needed; and/or (d) collect metrics and/or data concerning mobile device lifts (e.g., for marketing, warranty, and/or other purposes), mobile device alarms (e.g., real and/or false), and/or other mobile device activity (e.g., photos).

The security device, system, method and/or computer readable medium may preferably be adapted for integration and/or use in conjunction with and/or within software, which may be readily downloaded from any app store (e.g., Apple B2B, Google, Samsung, Blackberry, and/or Windows).

There may be two or more "app" portions to the device management system, method and/or computer readable medium according to the invention, preferably including a manager app portion which may be downloaded, e.g., from a URL. It may preferably be available for Android devices.

Figure 4:
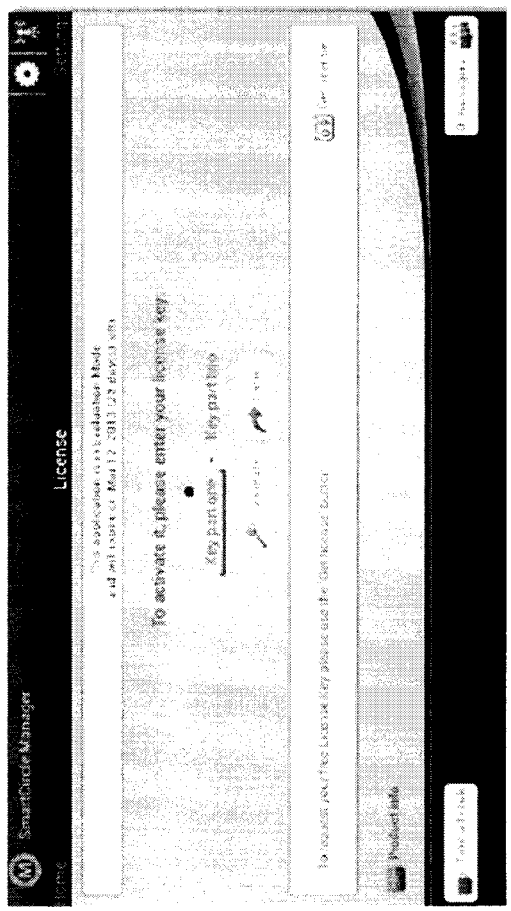
FIG. 4 shows a login and/or license screen of the manager app of the device management system.

After downloading and executing the manager app for the first time, it may present a login and/or license screen (such as shown in FIG. 4) for the first time. Licensed users may obtain a valid license key—for example, by email—from one or more remote, congruent, distributed, and/or back-end servers and/or databases (alternately hereinafter, simply "remote databases"). According to one aspect of the invention, the license key may be entered in one or more spaces provided on the license screen. The license key may, for example, be required to be entered twice. The license key may preferably then be validated, with reference to the remote databases, to afford the user with access to the manager app.

The license screen shown in FIG. 4 may preferably present an opportunity to enter and/or register/validate the license key later, if desired. According to some preferred embodiments of the invention, the manager device and app may run in demo mode without the license key, if it is not then and only later registered/validated. Alternately, selecting "later" may cause the application to close altogether.

Figure 5:
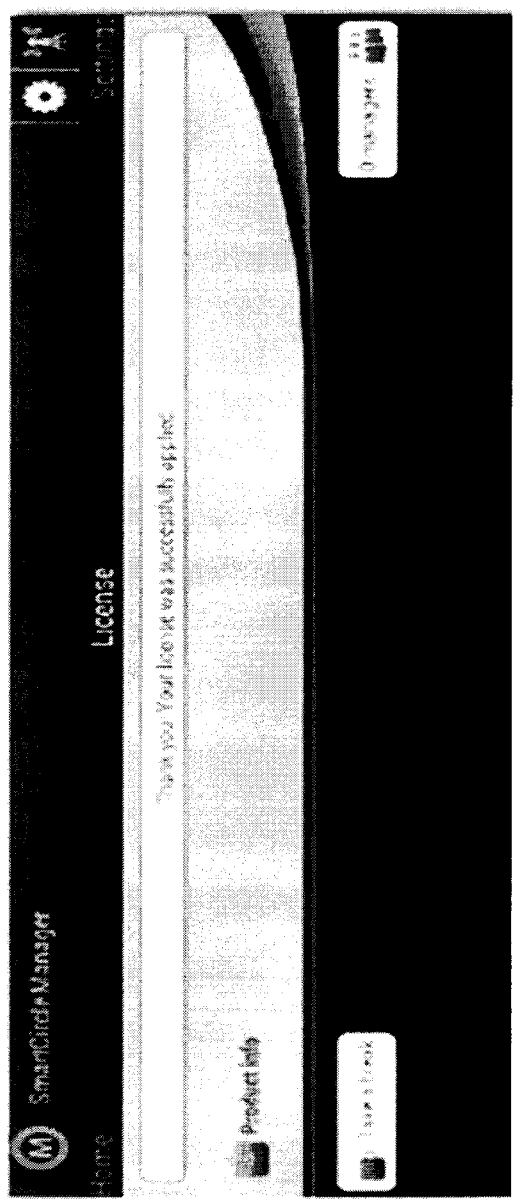
FIG. 5 shows a successful login screen of the manager app of the device management system.

After validation, if the user accesses the license screen, it may preferably indicate that the license was successfully applied as shown in FIG. 5. (Beforehand, and as shown in FIG. 4, it had indicated that the manager app was running in evaluation mode.) The device management system, method and/or computer readable medium may thus afford an easy-to-login-and-begin user experience.

Figure 6:
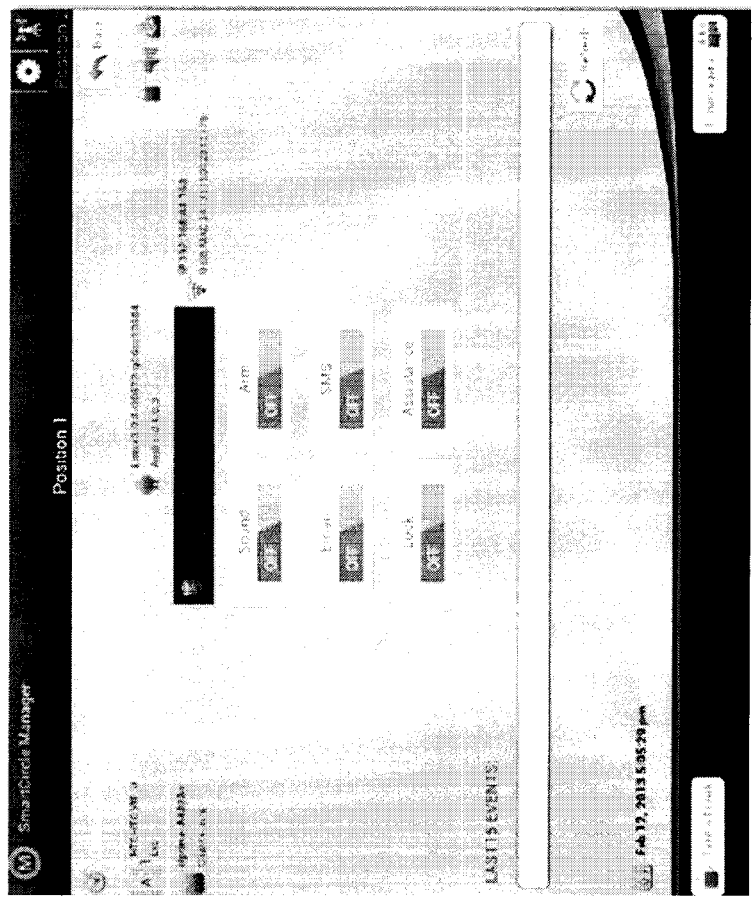
FIG. 6 shows a position screen presented by the manager app of the device management system.

According to one aspect of the present invention, and as depicted in FIG. 6 which illustrates a position screen which may preferably be presented by the manager app, the security system may enable one or more of the display devices to be customized and/or set. For example, one or more of the following display device characteristics may be customized and/or set on/off: sound, armed, email, SMS, lock, and/or assistance. Additionally, the security system may preferably enable the manager app to access the previous events (e.g., the last 15 events) experienced by one or more of the display devices.

Figure 7:
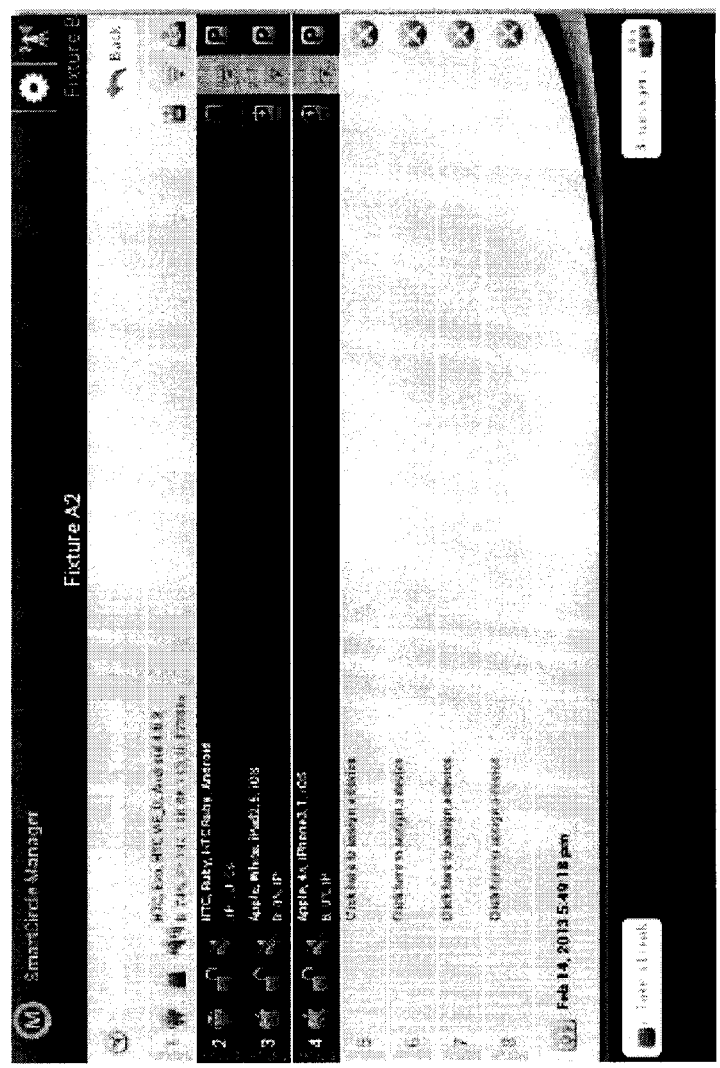
FIG. 7 shows a fixture on screen presented by the manager app of the device management system.

FIG. 7 shows a fixture screen which may preferably be presented by the manager app. It may preferably enable and/or facilitate monitoring of one or more of the display devices. Preferably, for each display device, the manager app may monitor: armed status, alarm volume, charge status, Wi-Fi status, device position (e.g., idle, lifted), and/or device type (e.g., Google, Apple, Samsung, Blackberry, and/or Windows).

Preferably, an operating system pipe, trunk and/or conduit for use with the security system according to the present invention may be reliable and cause little or no downtime.

As shown in FIG. 8, the security system (preferably including the manager and client/display apps) may preferably be accessed via a URL and downloaded from the remote databases.

Figure 9A:
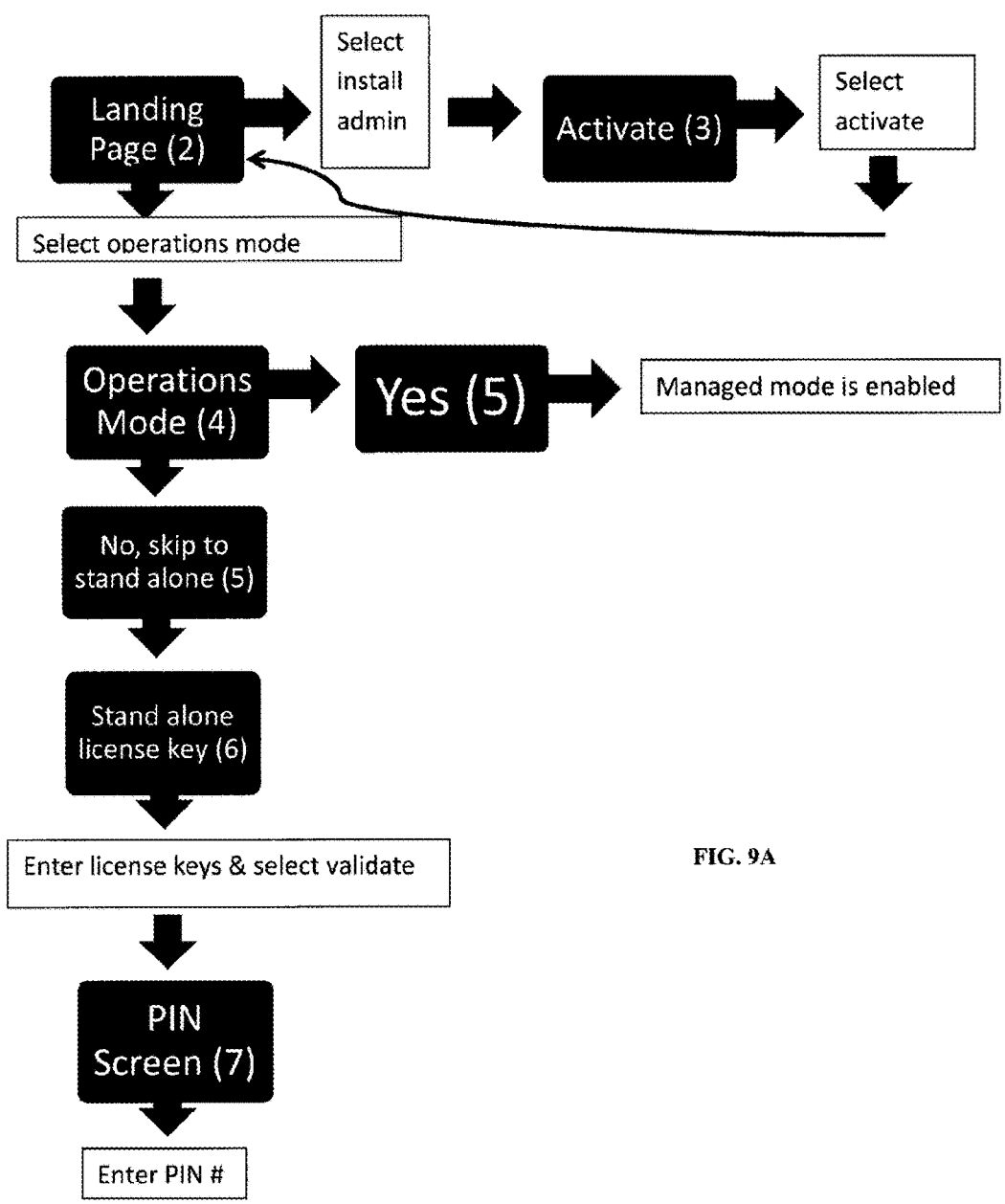
FIGS. 9A and 9B together schematically illustrate different pathways between various display screens which may be presented by a display device; running the display app of the device management system, in stand-alone mode.
Figure 9B:
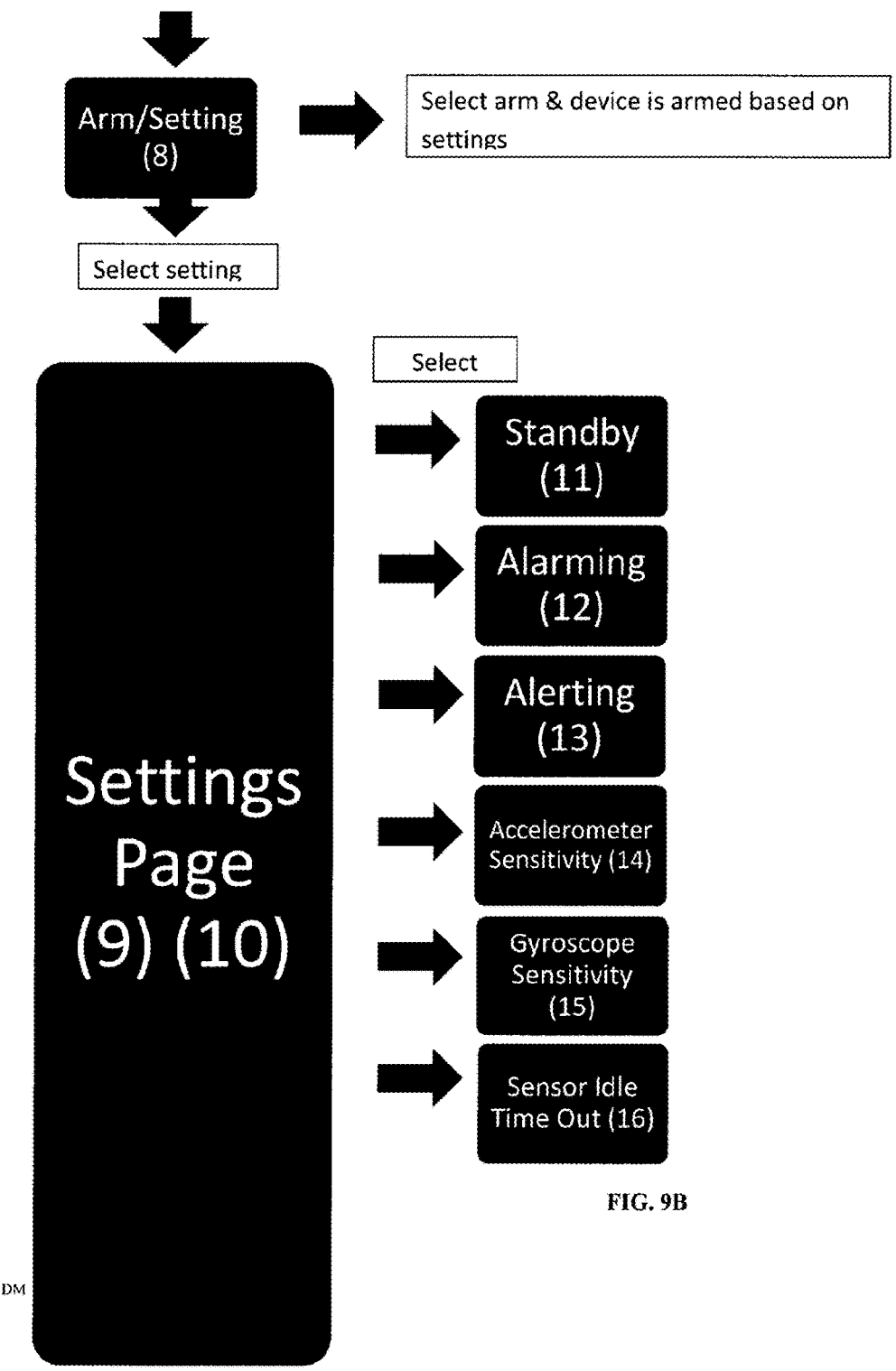

FIGS. 9A and 9B together schematically illustrate different pathways between various display screens which may be presented by a display device, running the display app, in stand-alone mode.

Figure 10:
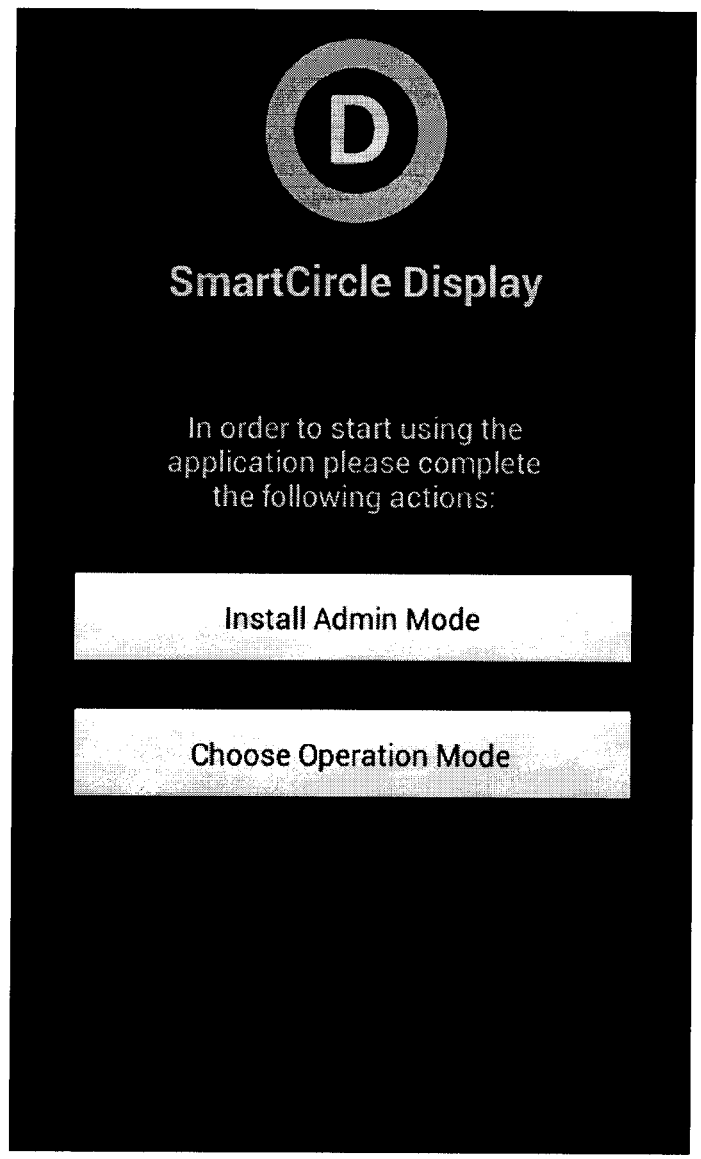
FIG. 10 shows a landing page presented by the display devices, running the display app of the device management system in standalone mode.

FIG. 10 shows a landing page which may preferably be presented by the display devices, running the display app in standalone mode. It may preferably present an option to selectively install an administrator ("admin") mode, and/or to select operations mode, if desired. Alternately, according to some embodiments of the invention, it may preferably present an option to calibrate the display device, if desired.

Figure 11:
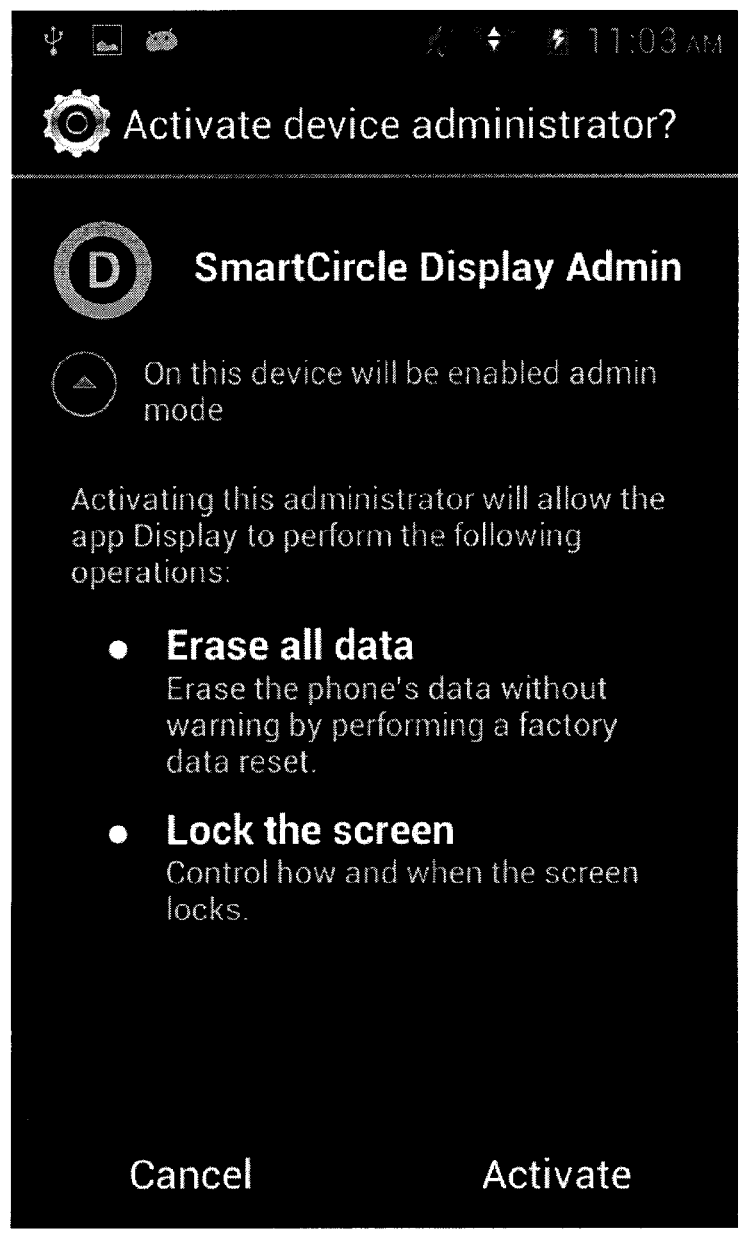
FIG. 11 shows an activate query page presented by the display devices, after selecting to install admin mode on the landing page.

FIG. 11 shows an activate query page which may preferably be presented by the display devices, after selecting to install admin mode on the landing page (shown in FIG. 10). It may preferably present options to selectively activate, or cancel activation of, a device admin mode as desired. As shown in FIG. 11, activation of admin mode may preferably allow the display app to control, among other things, how and/or when the display device screen locks.

Figure 12:
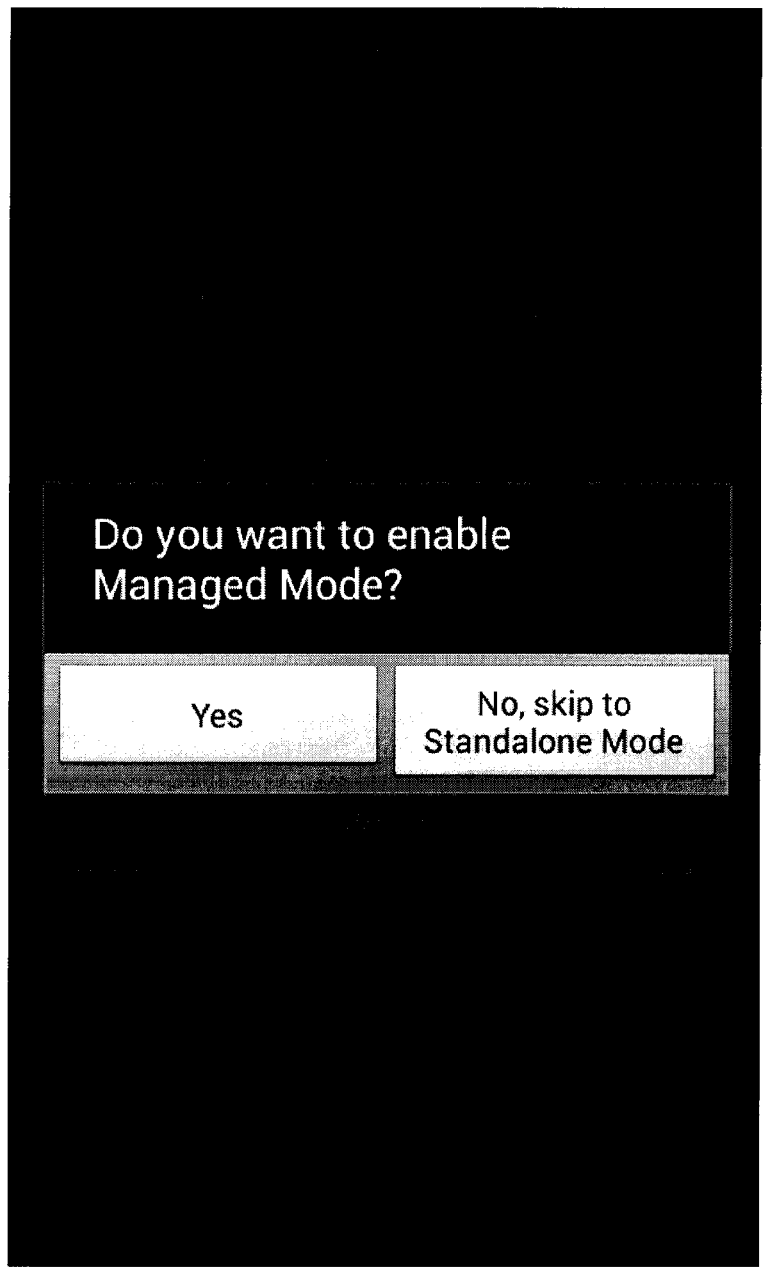
FIG. 12 shows a managed mode query page presented by the display app of the device management system.

If operations mode is selected from the landing page (shown in FIG. 10), then the display app may preferably present a managed mode query page (as shown in FIG. 12) and an option to selectively enable managed mode, or to skip to standalone mode, as may be desired. After selecting managed mode, the display device will become managed/controlled by the manager devices running the manager app (as described elsewhere herein).

Figure 13:
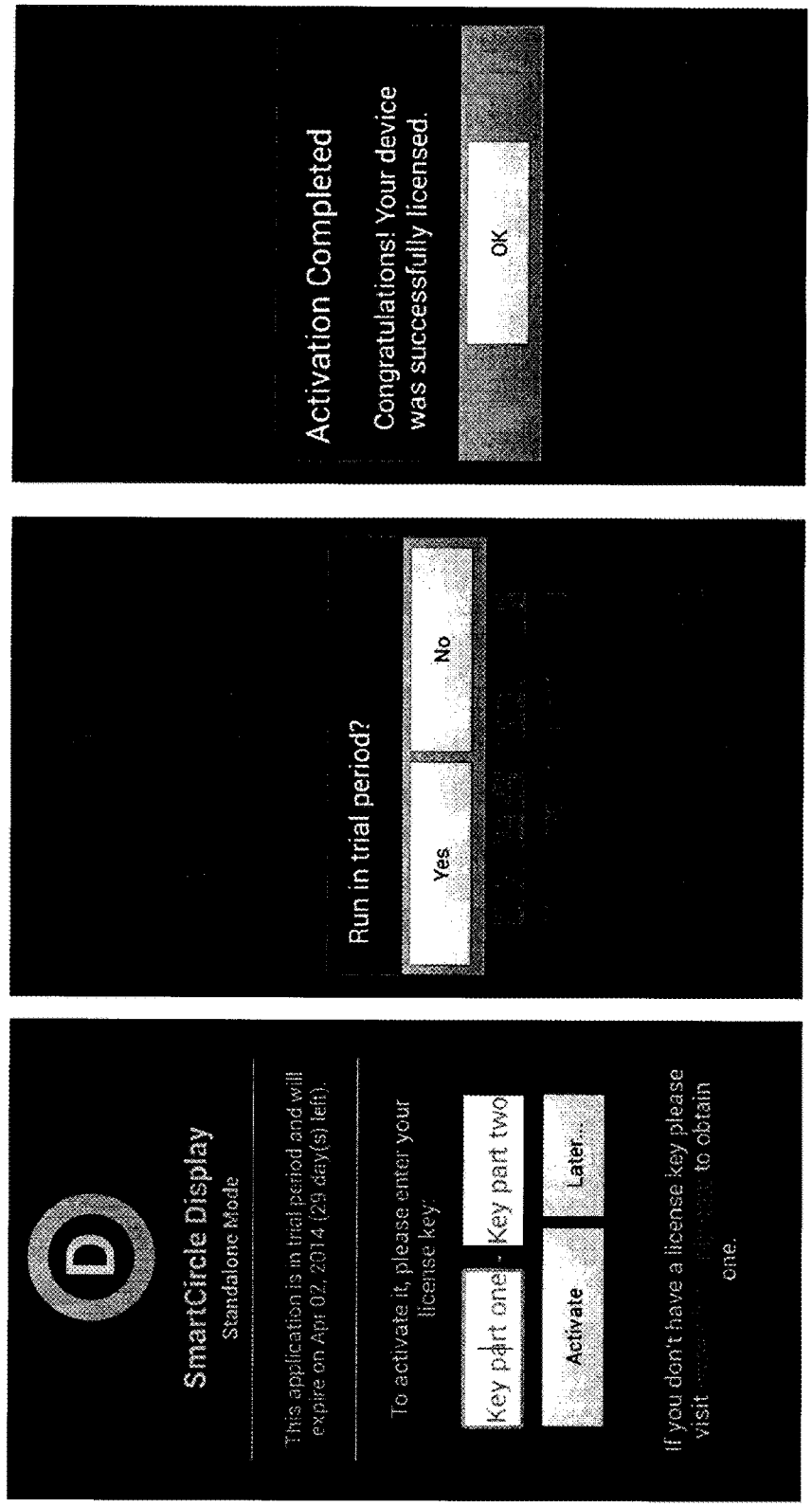
FIG. 13 shows a standalone license key screen presented by the display app of the device management system.

If skip to standalone mode is selected from the managed mode query page (shown in FIG. 12), then the display app may preferably present a standalone license key screen (as shown in FIG. 13) along with an opportunity to enter a license key (e.g., twice) and/or to, then or later, register/ validate the license key, as may be desired. According to some preferred embodiments of the invention, the display device may run standalone in demo mode without the license key, if it is not then and only later registered/validated. Alternately, selecting "later" may cause the application to close altogether.

Figure 14:
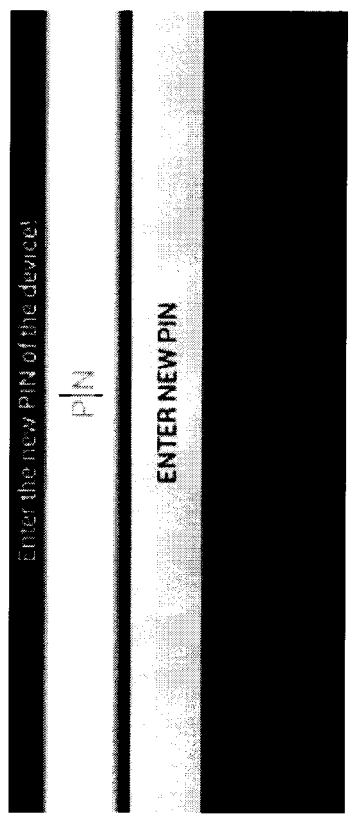
FIG. 14 shows a PIN screen presented by the display app of the device management system.

Thereafter, the display app may preferably present a PIN screen as shown in FIG. 14 and/or an opportunity to enter a PIN (preferably a device PIN not an app PIN) and/or to change the PIN by entering a new one.

Figure 15:
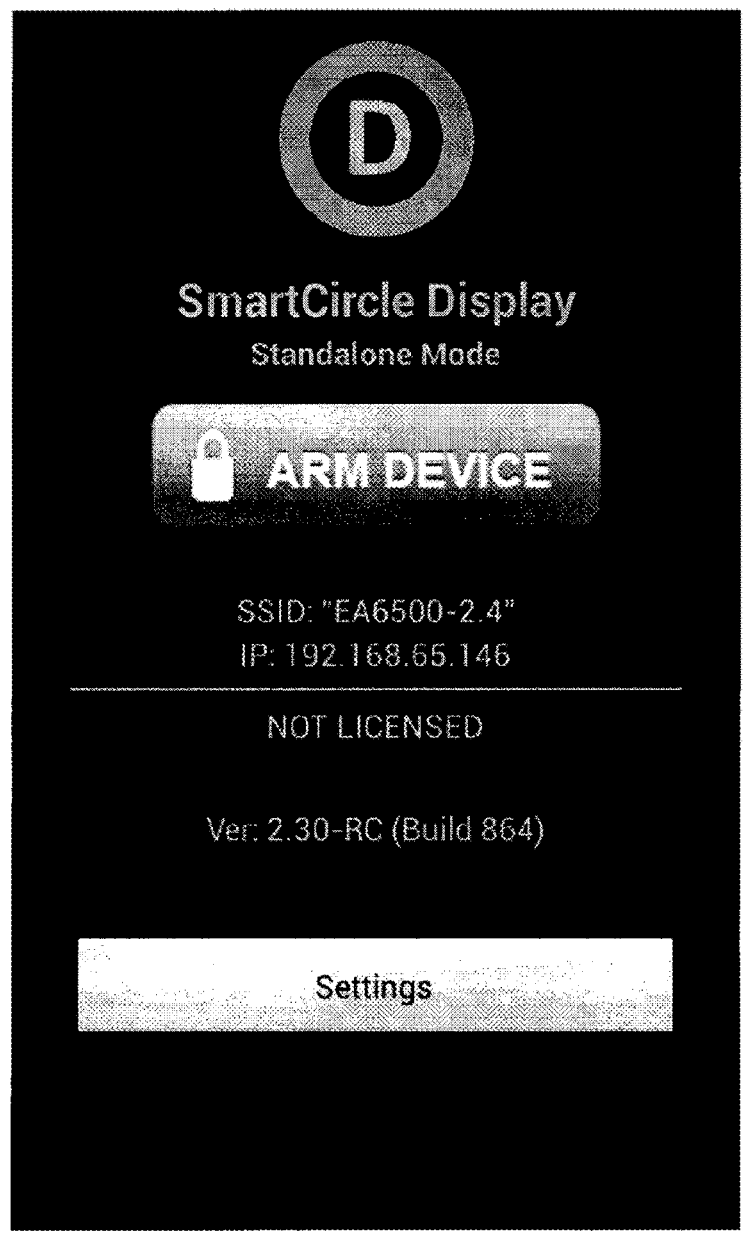
FIG. 15 shows an arm/settings screen presented by the display app of the device management system.

Preferably, after entry of a device PIN on the PIN screen shown in FIG. 14, the display app (then running in standalone mode) may preferably present an arm/settings screen (as shown in FIG. 15). Selecting to arm the device from this screen may preferably result in alerts being triggered according to the settings configuration. The arm/settings screen shown in FIG. 15 also presents an option to enter the settings configuration mode.

Arming the device may preferably, according to some embodiments of the invention, converts stand-alone mode to managed mode, where the manager device takes control of the display device. At that time, navigation is still within the display app, not the manager app. Selecting arm devices means alerts will be triggered as per the configuration.

Figure 16A:
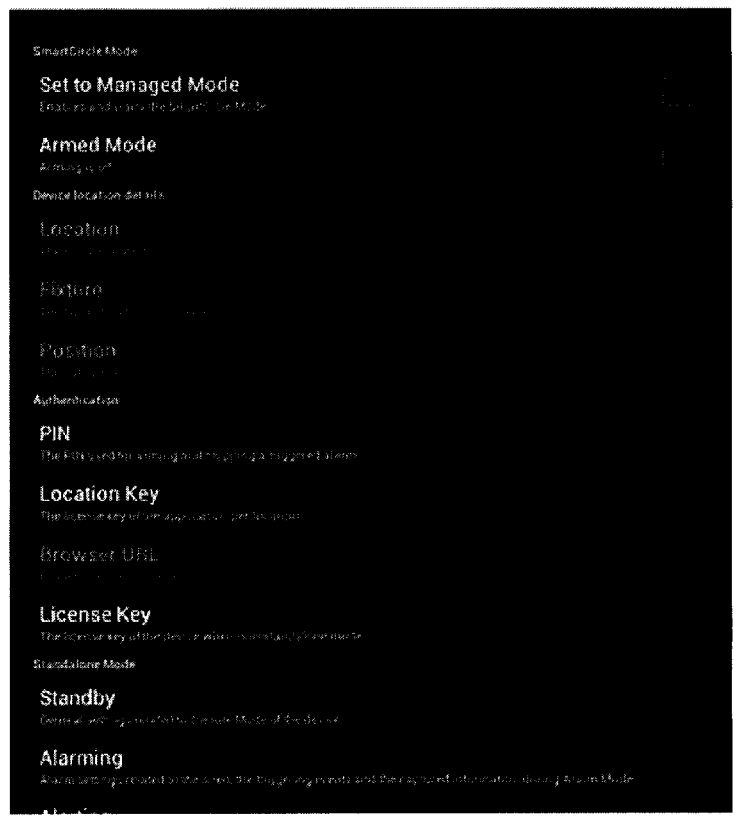
FIG. 16A and 16B together show the settings configuration page accessed from the arm/settings screen illustrated in FIG. 15.
Figure 16B:
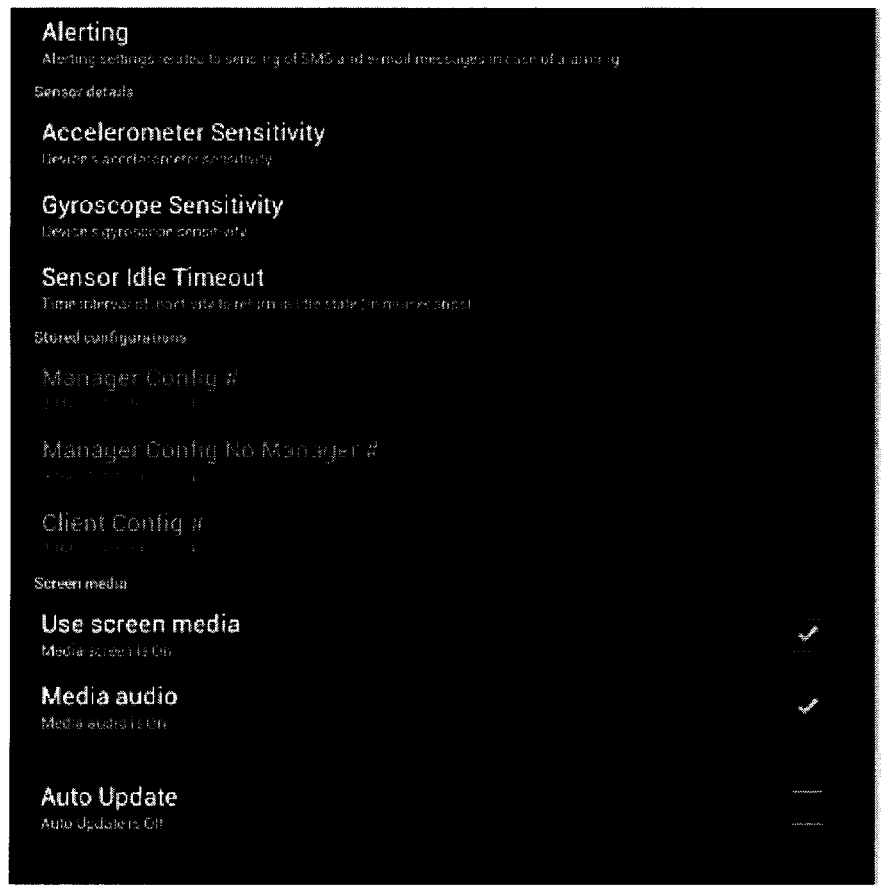

FIGS. 16A and 16B together show the settings configuration page which may preferably be accessed from FIG. 15 as aforesaid. Certain settings on the configuration page may preferably be toggled on/off using check boxes, and others may preferably be configured via additional screens which may preferably be accessed therefrom. From the configuration page, the display device may preferably be toggled: managed mode on/off; armed mode on/off; use screen media on/off (e.g., enabling selectable media to be played when the device is idle and/or stopping that selectable media when the device is tapped and/or lifted); media audio on/off; and/or auto update on/off. From the configuration page, one or more of the following device characteristics may preferably be set/configured: location (e.g., name of the retail location); current fixture (e.g., display) in the retail location; current position in the fixture; PIN used for arming/stopping a triggered alarm; the license key of the application per the location; browser URL/Internet resources if available; the license key of the device when in standalone mode; the manager configuration number; manager configuration with no manager number; and/or the display configuration number.

Figure 17:
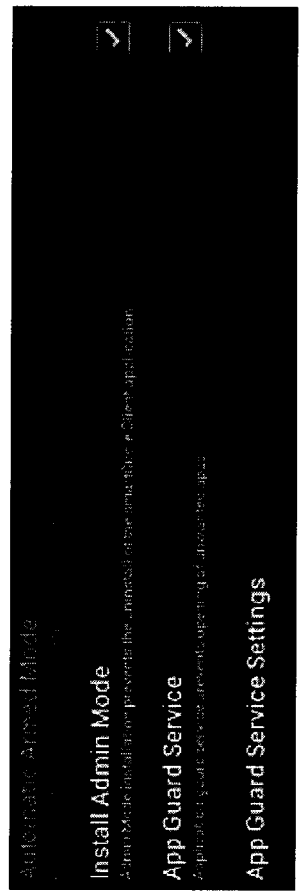
FIG. 17 shows a standby configuration screen accessed from the settings screen illustrated in FIGS. 16A and 16B.

A standby configuration screen (as shown in FIG. 17) may be accessed from the settings screen (shown in FIGS. 16A and 16B). The standby configuration screen includes general settings related to the idle mode of the display device in standalone mode. From the standby configuration screen, the display device may preferably be toggled: automatic armed mode on/off; install admin mode on/off (preventing the uninstall of the security system from the device through standard application manager processes, reducing the chance that someone may delete the app while testing the phone in the store); and/or app guard service on/off (preventing the opening of unwanted apps that are downloaded, reducing the chance that inappropriate material may be left on devices for subsequent customers). It also may preferably permit the app guard service settings to be set/configured.

Figure 18:
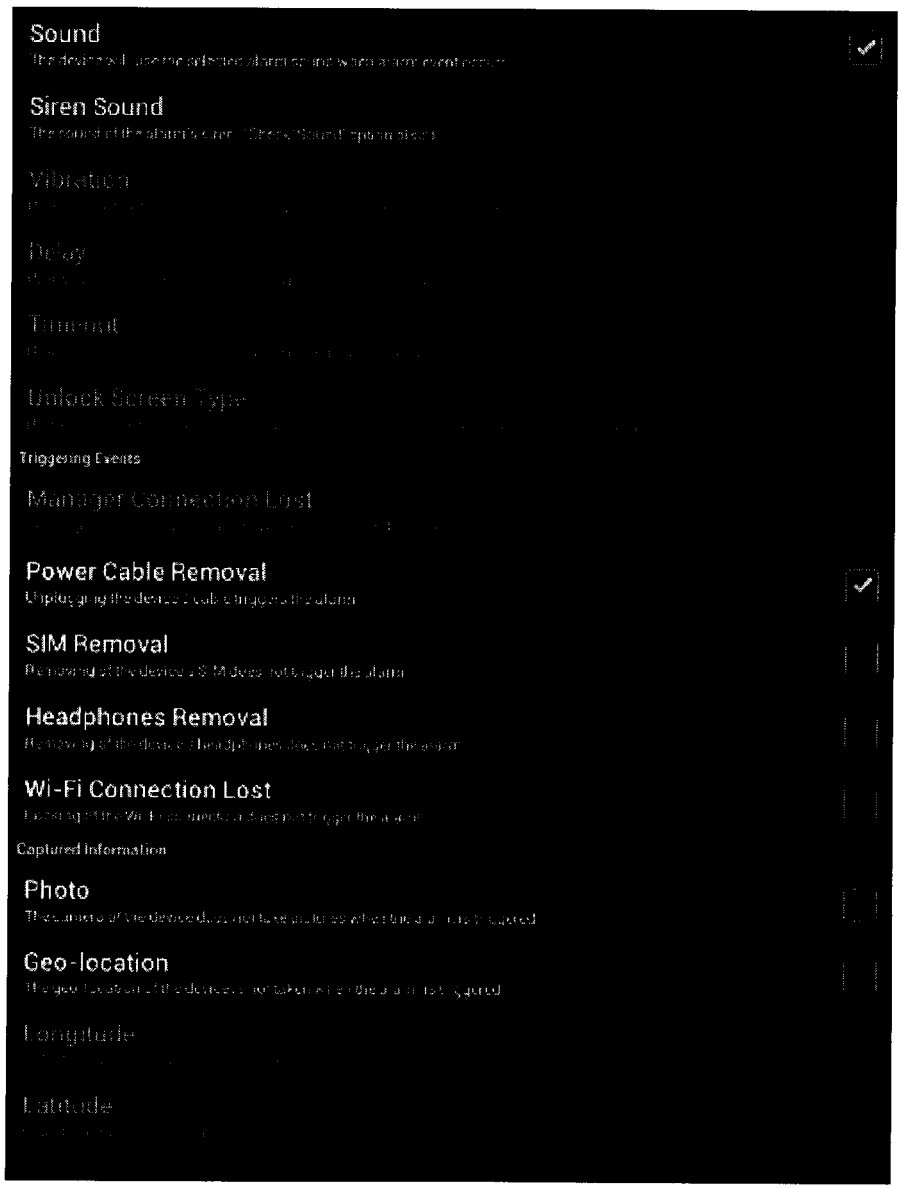
FIG. 18 shows an alarming configuration screen accessed from the settings screen illustrated in FIGS. 16A and 16B.

An alarming configuration screen (as shown in FIG. 18) may be accessed from the settings screen (shown in FIGS. 16A and 16B). The alarming configuration screen includes alarm settings related to the siren, the triggering events, and/or the captured information during alarm mode. From the alarming configuration screen, the display device may preferably be toggled: sound on/off (e.g., the device may use a selected alarm sound when an alarm event occurs); manager connection lost trigger on/off; power cable removal trigger on/off (e.g., unplugging the device cable may trigger the alarm); SIM removal trigger on/off (e.g., removing the device SIM card may trigger the alarm); headphones removal trigger on/off (e.g., removing the may headphones trigger the alarm); Wi-Fi connection lost trigger on/off (e.g., losing the Wi-Fi connection may trigger the alarm); capture photo information on/off (e.g., the camera on the device may take one or more pictures when the alarm is triggered); capture geo-location information on/off (e.g., the geo-location of the device may be taken when the alarm is triggered). As shown in FIG. 18, other alarming settings which may preferably be set/configured include vibration (e.g., allowing the manager device to vibrate upon alarm trigger), delay (e.g., setting a time between an event triggering an alarm, and the actual siren activation), timeout (e.g., duration of siren, once alarm is triggered), and/or unlock screen type (e.g., determining how the screen may be unlocked when the alarm is triggered, whether by swiping, PIN entry and/or otherwise). As shown in FIG. 18, other information which may be captured from the device when the alarm is triggered may preferably include latitude and/or longitude information.

Figure 19:
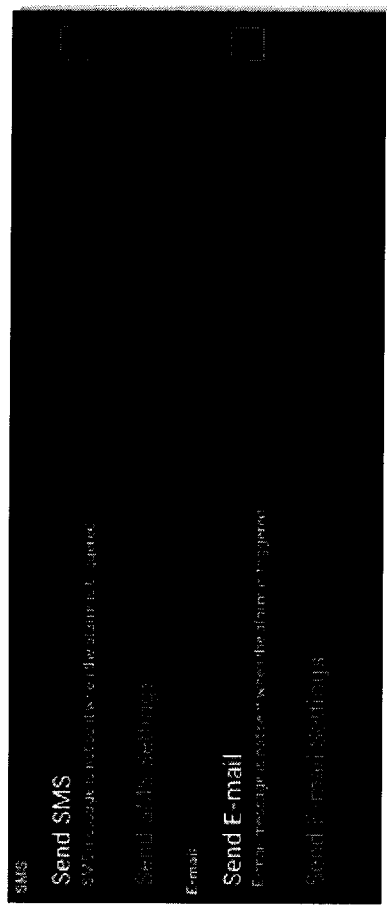
FIG. 19 shows an alerting configuration screen accessed from the settings screen illustrated in FIGS. 16A and 16B.

An alerting configuration screen (as shown in FIG. 19) may be accessed from the settings screen (shown in FIGS. 16A and 16B). The alerting configuration screen includes alerting settings related to sending of SMS and email messages in case of alarming From the alerting configuration screen, the display device may preferably be toggled: send SMS on/off (e.g., an SMS message may be sent when an alarm is triggered); and/or send email on/off (e.g., an email message may be sent when an alarm is triggered). As shown in FIG. 19, the SMS and email send settings may preferably also be set/configured according to the invention.

Figure 20:
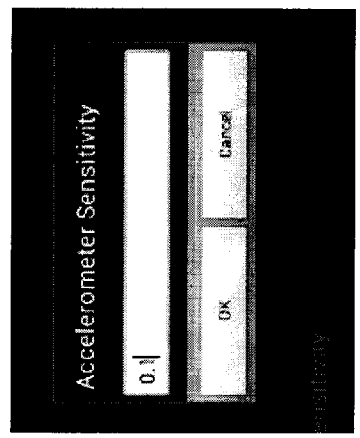
FIG. 20 shows an accelerometer configuration screen accessed from the settings screen illustrated in FIGS. 16A and 16B.

An accelerometer configuration screen (as shown in FIG. 20) may be accessed from the settings screen (shown in FIGS. 16A and 16B). The accelerometer configuration screen presents an opportunity to enter a quantitative setting of the device's accelerometer sensitivity. The accelerometer may preferably be used to detect changes in orientation and/or to tell the screen to rotate (e.g., to help the phone know up from down). According to one aspect of the invention, it is used to trigger selectable media starts and stops.

Figure 21:
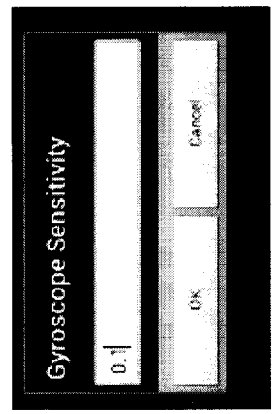
FIG. 21 shows a gyroscope configuration screen accessed from the settings screen illustrated in FIGS. 16A and 16B.

A gyroscope configuration screen (as shown in FIG. 21) may be accessed from the settings screen (shown in FIGS. 16A and 16B). The gyroscope configuration screen presents an opportunity to enter a quantitative setting of the device's gyroscope sensitivity. A gyroscope may preferably be used to measure and/or maintain the orientation of a device, and/or to sense motion including vertical and horizontal rotation.

Figure 22:
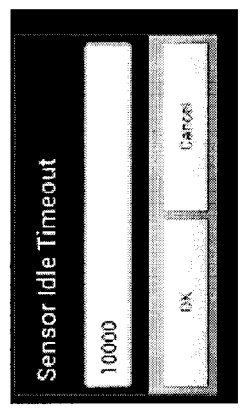
FIG. 22 shows a sensor idle configuration screen accessed from the settings screen illustrated in FIGS. 16A and 16B.

A sensor idle configuration screen (as shown in FIG. 22) may be accessed from the settings screen (shown in FIGS. 16A and 16B). The sensor idle configuration screen presents an opportunity to enter a time interval of inactivity (e.g., in seconds and/or milliseconds) before the device returns to an idle state, preferably to trigger the idle selectable media.

Figure 23:
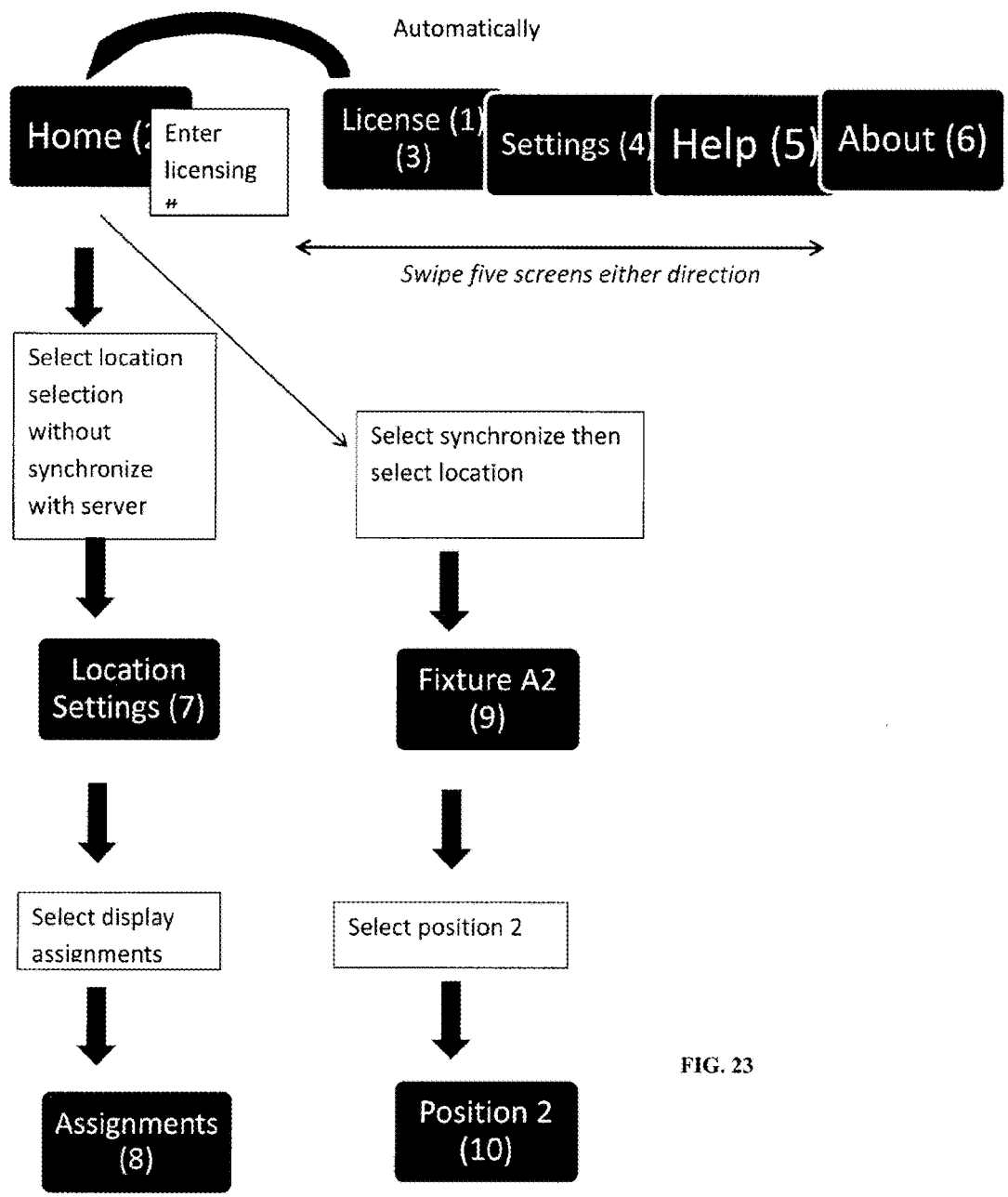
FIG. 23 schematically illustrates different pathways between various display screens presented by a control/manager device, running the manager app of the device management system.

FIG. 23 schematically illustrates different pathways between various display screens which may be presented by a control/manager device, running the manager app. The manager app is an app which may preferably create a wireless communication link with mobile devices, running the display app, on the same network. This communication link may preferably provide information from the display app to the manager app, and may preferably allow the manager app to trigger events within the display devices. The manager app (as with the client/display app) is adapted for execution on a mobile device, preferably but not necessarily with a touchscreen. As may be appreciated from a consideration of FIG. 23, one or more screens presented by the manager app may be readily accessed by swiping in one direction or another.

The license screen of the manager app is discussed elsewhere herein in the context of FIGS. 4 and 5. Various screens presented by the manager app, including those shown in FIGS. 4 and 5, may include common icons and/or functionality. For example, manager app settings and Wi-Fi connection icons appear in the top right corner of the license screens shown in FIGS. 4 and 5. The Wi-Fi connection icon, when selected, navigates to a Wi-Fi settings/configuration screen. The manager app screens may also include a common pause (e.g., "take a break") button—for example, as shown in the lower left corner of the license screens in FIGS. 4 and 5—which pauses the manager app/disconnects the manager for a selected period of time when selected. Also included may be a display product info button which, when selected, is effective to display the application and proprietor names, along with the version information. The various screens of the manager app may preferably also include an indication of the number of managers active in the app.

Figure 26:
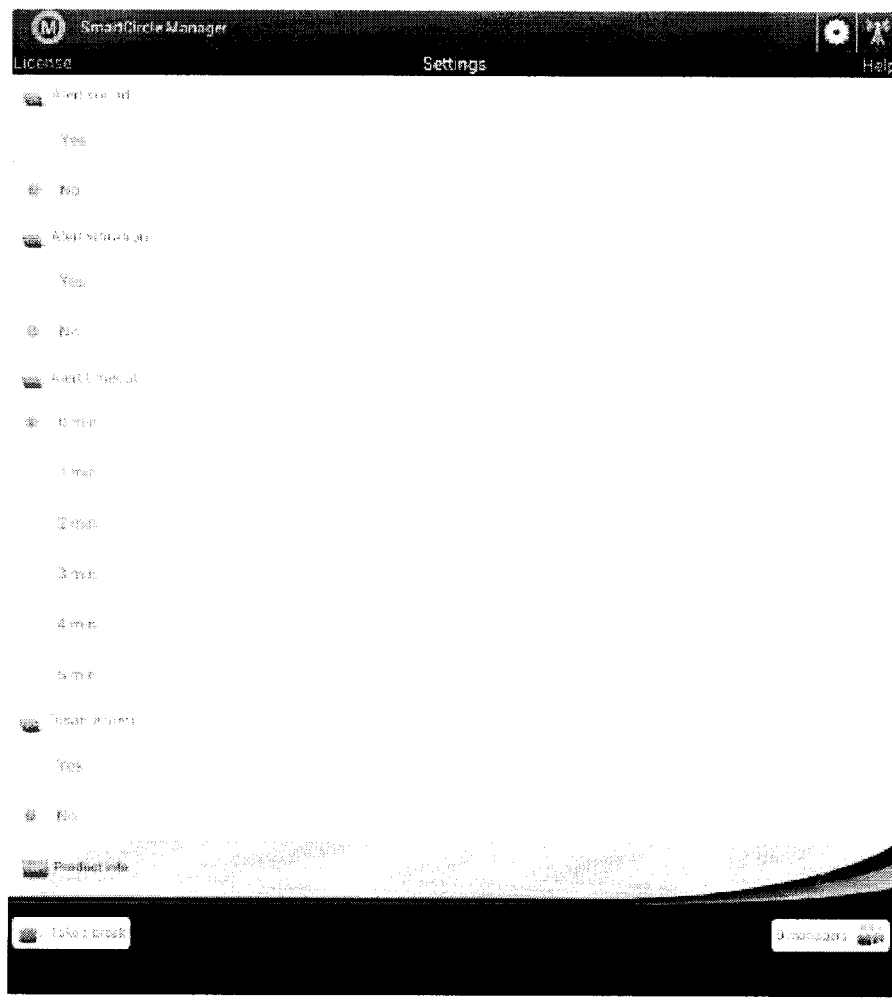
FIG. 26 shows a settings screen accessible from the login screens illustrated in FIGS. 4 and 5; expanded to show various settings selections/options.
Figure 27:
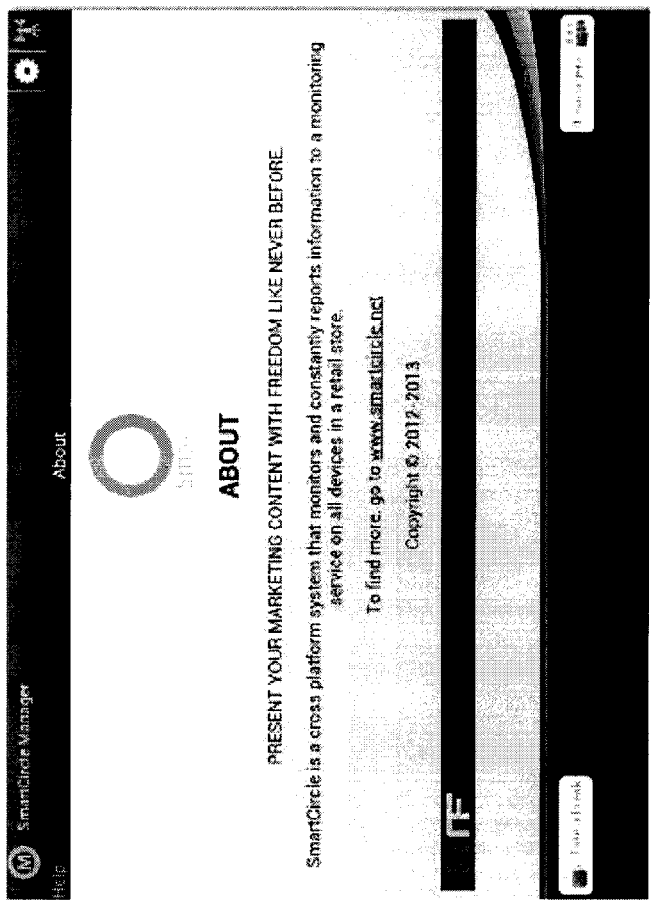
FIG. 27 shows an about screen that provides information concerning the software application and/or proprietor.

Swiping onward from the license screen shown in FIGS. 4 and 5, a settings screen may preferably be expanded as in FIG. 26 to show various settings selections/options, including: alert sound yes/no; alert vibration yes/no; alert timeout (e.g., 0, 1, 2, 3, 4 or 5 minutes); disable alert yes/no; and/or product information. These settings may preferably be for the manager device, not the display devices. As may be best appreciated from a consideration of FIG. 23, a help screen (not shown) may preferably be similarly accessed, by swiping onward from the settings screen which is shown in FIG. 26. An about screen (as shown in FIG. 27) may preferably be accessed, by swiping onward from the help screen (not shown), to obtain information concerning the software application and/or proprietor.

Figure 24:
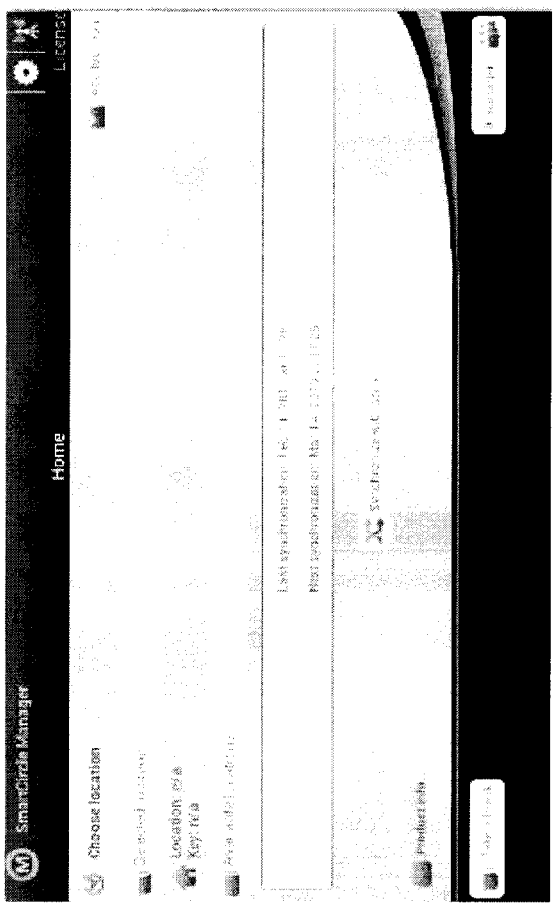
FIG. 24 shows a home screen presented by the manager app of the device management system.
Figure 25:
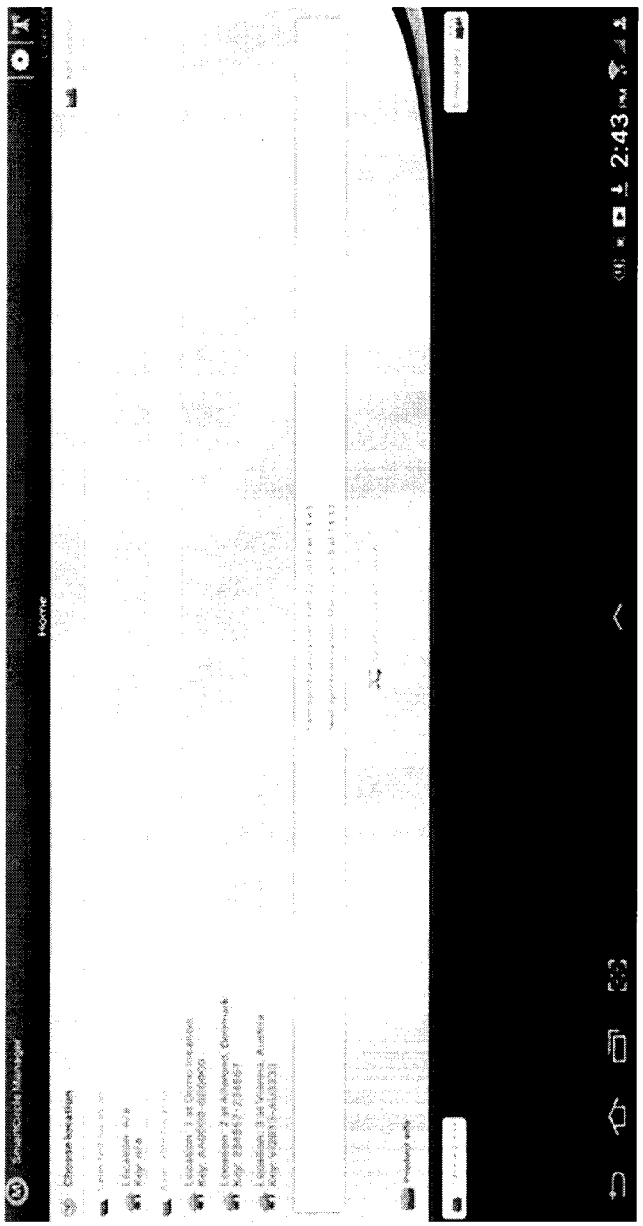
FIG. 25 shows a drop-down list of available locations revealed by clicking on the available locations folder on the home screen illustrated in FIG. 24.

A home screen presented by the manager app is shown in FIG. 24. It includes an add location button (e.g., in the top right) which may preferably navigate to a URL form which asks for another location. It may preferably also include a choose location heading and a selected location folder (e.g., in the top left), as well as a synchronize with server button. Additionally, the home screen may include an available locations folder (e.g., below the selected locations folder). Clicking on the available locations folder (in FIG. 24) may preferably reveal a drop-down list of available locations (as shown in FIG. 25) which may preferably have been previously entered and/or set-up via the add location button. The home screen, as shown in FIGS. 24 and 25, may preferably also indicate the last synchronization of the manager app/device with the remote databases and/or the timing of any upcoming synchronizations which may be scheduled.

Figure 28:
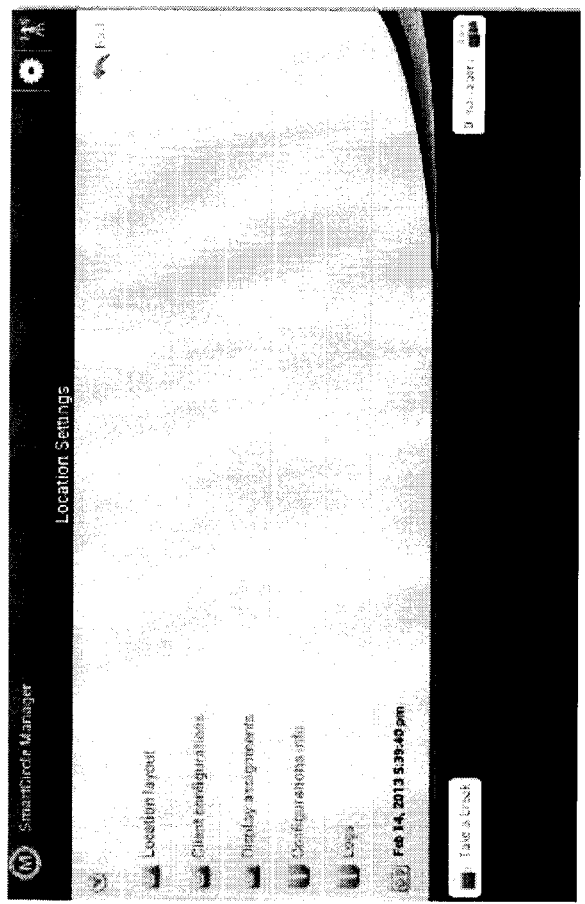
FIG. 28 shows a location settings screen accessible through the home screen illustrated in FIG. 24 by clicking on the selected location folder without synchronization.

Clicking on the selected location folder without synchronization (in FIG. 24) navigates to a location settings screen as shown in FIG. 28. The location settings screen may preferably include a "back" button which navigates to the home page, and/or an indication of the last synchronization of the manager app/device with the remote databases. It may also include a logs button (e.g., providing log information), a configuration info button (e.g., providing configuration info), a client configuration button allowing the manager to configure the manager app (e.g., alerts), and a location layout button allowing the manager to configure the layout (e.g., number of fixtures).

Figure 29A:
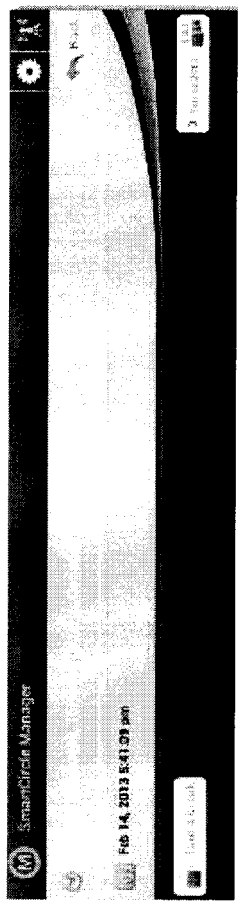
FIGS. 29A and 29B shows screens that illustrate which display devices are available to be added to and/or monitored by the manager device being used.
Figure 29B:

The location settings screen shown in FIG. 28 may preferably also include a display assignments button that, when selected (and the server is not synced), indicates which display devices are available to be added to and/or monitored by the manager device being used (as shown in FIGS. 29A and 29B). The devices with the black bars across them in FIG. 29B are thus indicated as already being managed by this manager device. This screen reveals a letter (e.g., in this case either "A" or "B" on the left side of the screen) that may preferably indicate the fixture to which the device has been assigned. The number beside the letter may preferably indicate the placement of the device on the fixture. The icon may preferably indicate the type of device, and the name is that given to the device.

Figure 29C:
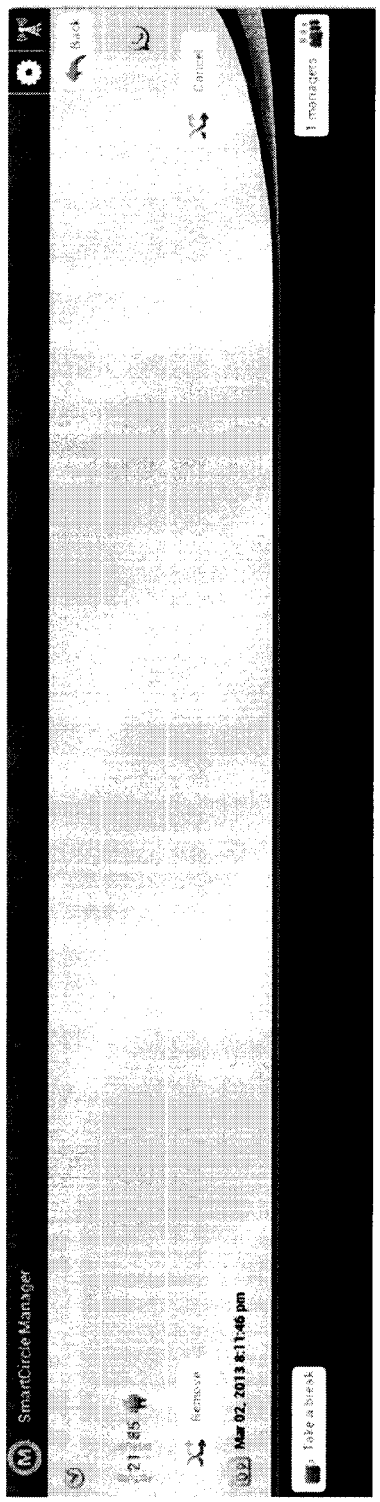
FIG. 29C shows a screen which allows a user to select a device to be removed.

If the user wants to remove a device, the user may preferably select the device to reveal the screen shown in FIG. 29C. Then, the user may preferably select "Remove" to remove the device, if desired.

Selecting synchronize with server in FIG. 24 may preferably give permission to access location and/or sync location layout.

Figure 30:
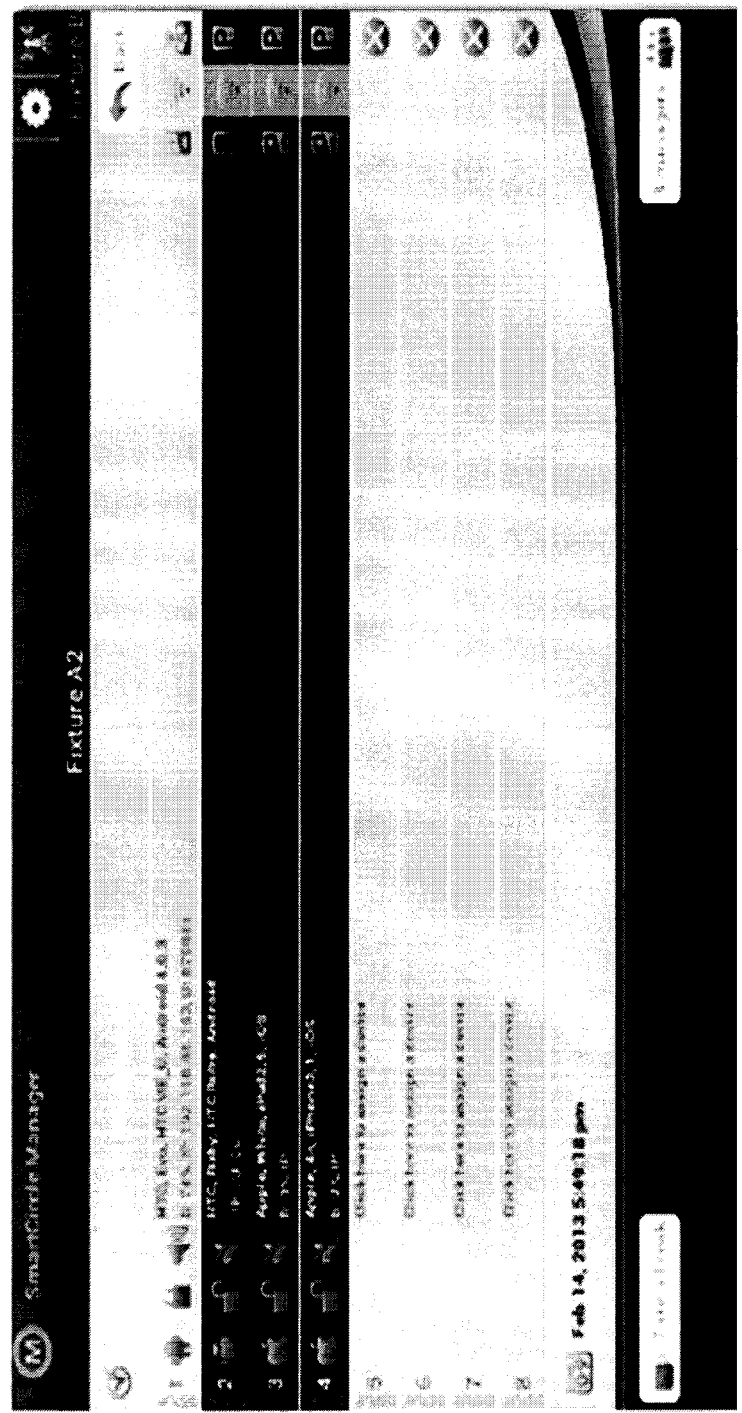
FIG. 30 shows a fixture screen that is accessible through the home screen illustrated in FIG. 24 by clicking on the selected location folder with synchronization.

Clicking on the selected location folder with synchronization (in FIG. 24) navigates to a fixture screen as shown in FIG. 30. The fixture screen is presented after synchronization with the remote databases upon navigation from the home page. This screen indicates, among other things, the location of the manager device, and each row indicates one of the display devices which have established a link with the manager device, as well as the status of each display (e.g., smartphone or tablet) device. Certain information may be presented on the fixture screen by a variety of icons. As shown in FIG. 30, each row may preferably be numbered (e.g., preferably according to the position of the display device on the fixture) and may preferably include icons to indicate the type of display device (e.g., Android, Apple), whether the device is armed or unarmed (e.g., the alarm triggered when armed), and/or whether the alarm is muted or not. Each row also may preferably include icons to indicate: (1) the degree of power in the client device and whether it is charging (e.g., with red indicating not charging); (2) the strength of the device's Wi-Fi connection if any (e.g., with orange indicating no Wi-Fi connection); and/or (3) the device position (e.g., "P" indicating a parked position, "X" indicating no device in that position, and/or another icon indicating that the device is lifted). A black or darkened row may preferably be used to indicate a problem with one of the last-mentioned three (3) indicators, and/or that the alarm has been triggered for that device. Preferably, each row may additionally provide device details (e.g., company name, model name, series number and/or operating system), an IP address, and/or a measure (e.g., in seconds) of uninterrupted power to the device.

Figure 31:
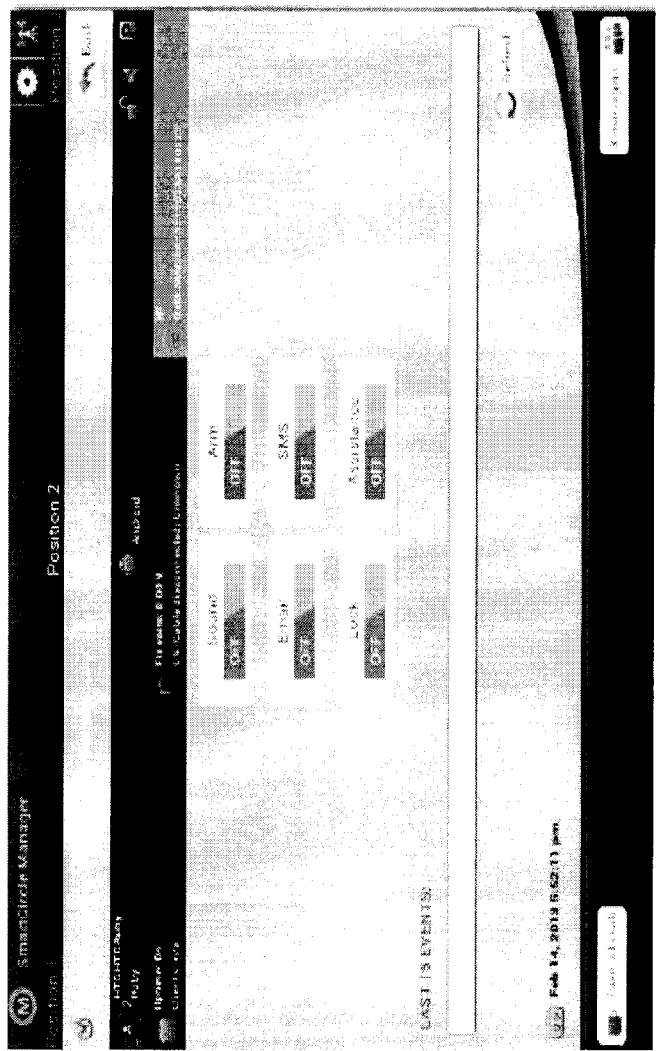
FIG. 31 shows a position screen which similar to that shown in FIG. 6.

FIG. 31 presents a position screen which (is very similar to that shown in FIG. 6 and) includes a status bar/row that indicates much of the same information as shown in FIG. 30, including: the fixture; the display position; the device name; the device type; whether the device is armed; whether the alarm is muted; and/or the device position. An additional status bar/row in FIG. 31 indicates one or more of the following: uptime (e.g., in seconds); the client device version; the charging status of the device (e.g., volts, percentage charged, reason for charge); the and/or Wi-Fi connection status (e.g., including the IP address) of the device. As may be discussed elsewhere herein, the position screen may also preferably include one or more of the following action buttons: sound (e.g., mute or unmute alarm); arm (e.g., set the alarm); email (e.g., send notification of problem by email); SMS (e.g., send notification of problem by SMS); lock (e.g., lock or unlock the phone); assistance (e.g., an employee can ask a customer if they would like assistance). The position screen, as shown in FIG. 31, may also preferably track the last 15 event of the manager on the device, and/or include a button to refresh the connection with the remote databases.

Figure 32:
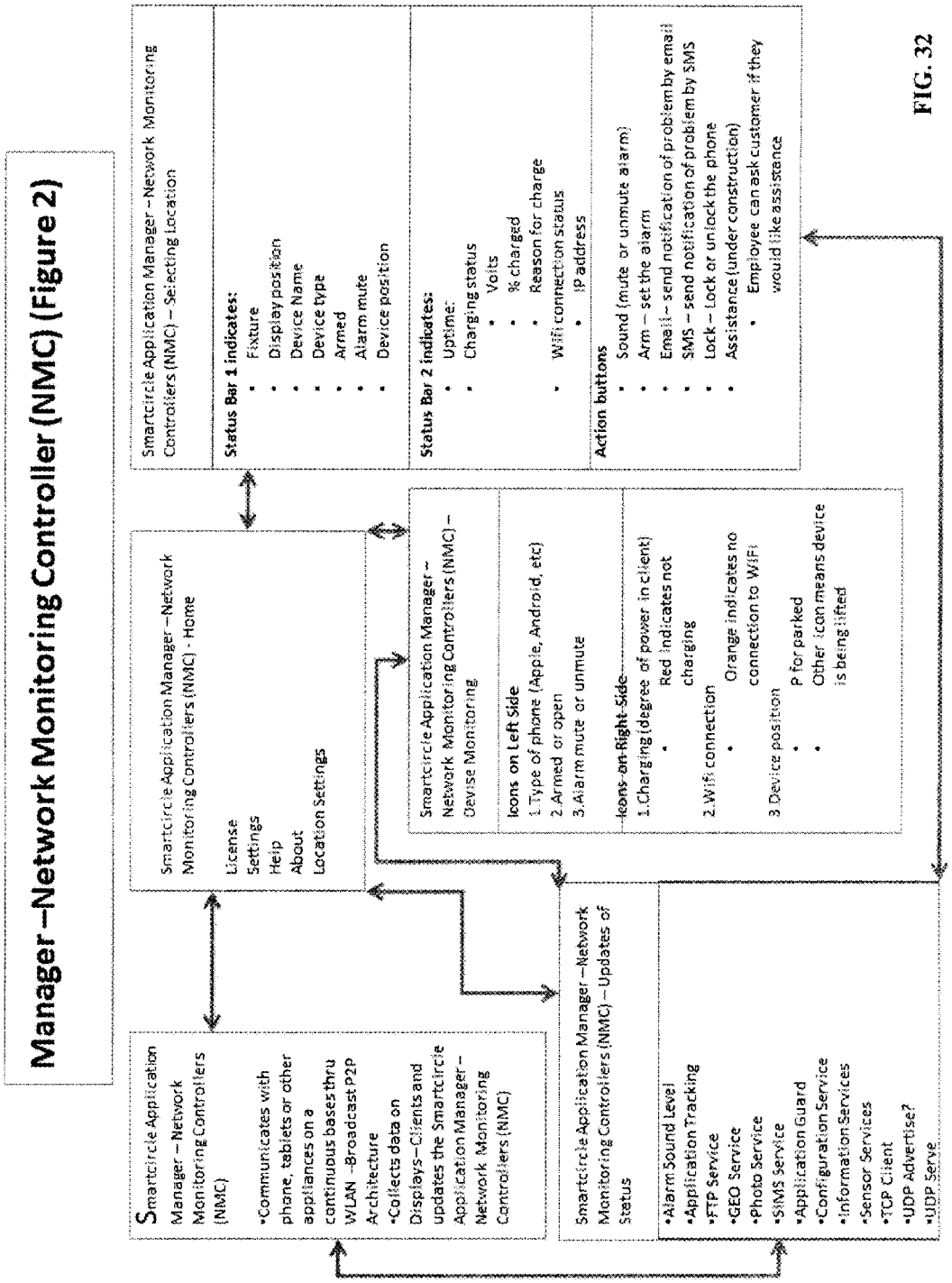
FIG. 32 schematically illustrates the manager/network monitoring controller portions of the device management system.
Figure 33:
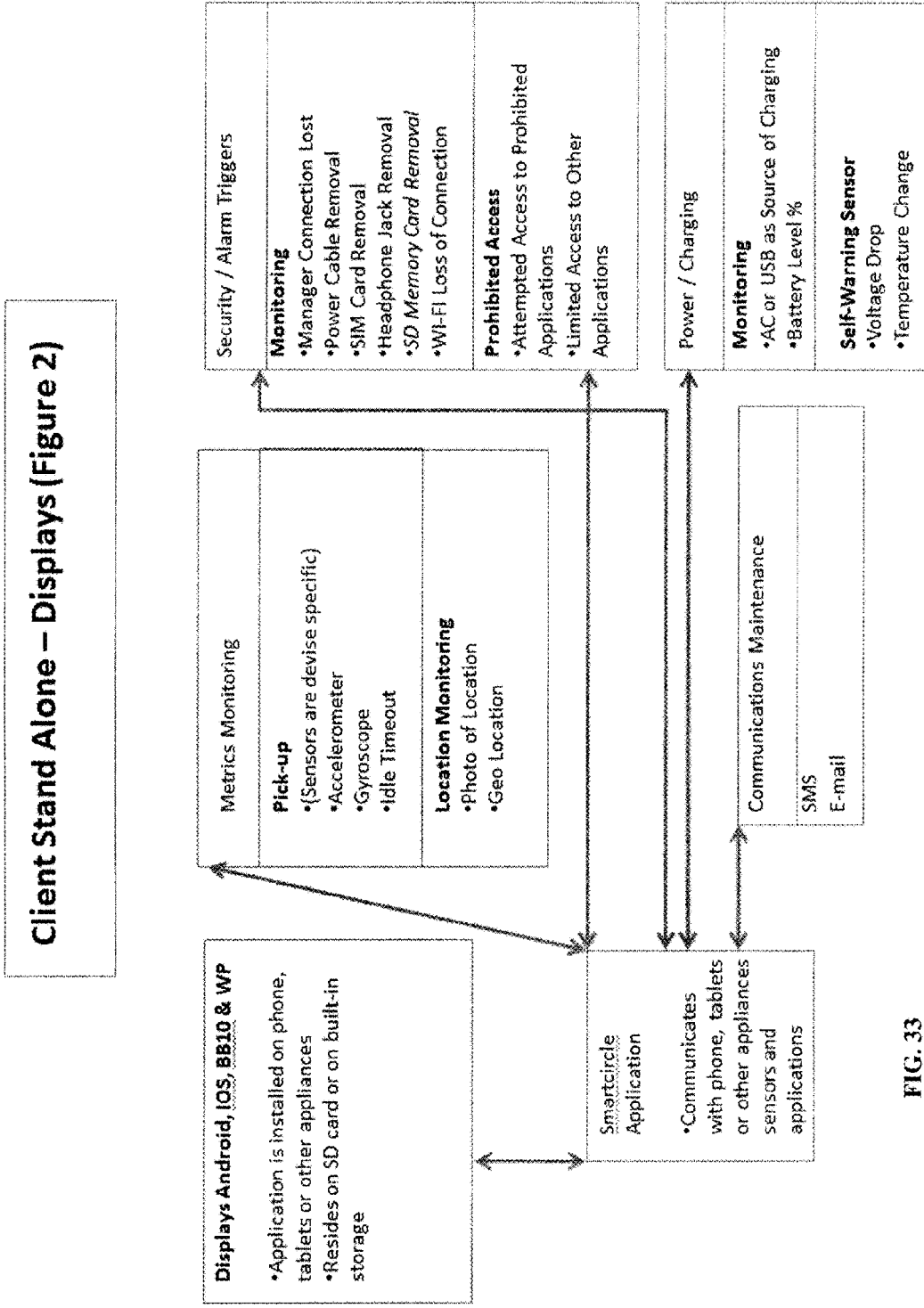
FIG. 33 schematically illustrates the standalone client portion of the device management system.

FIG. 32 schematically illustrates the manager/network monitoring controller portions of the security system. FIG. 33 schematically illustrates the standalone client portion of the security system.

According to one aspect of the invention, there is also provided a digital media (alternately referred to herein as "digital signage" or simply "DS") application which—in conjunction with one or more other embodiments described herein and/or on its own—may preferably enable one or more of the display devices to run different media (e.g., videos, URLs, images) when such devices are idle, tapped and/or lifted. Preferably, depending on the status of each device, the DS app may trigger media on separate devices, such as, for example, a monitor.

Figure 34:
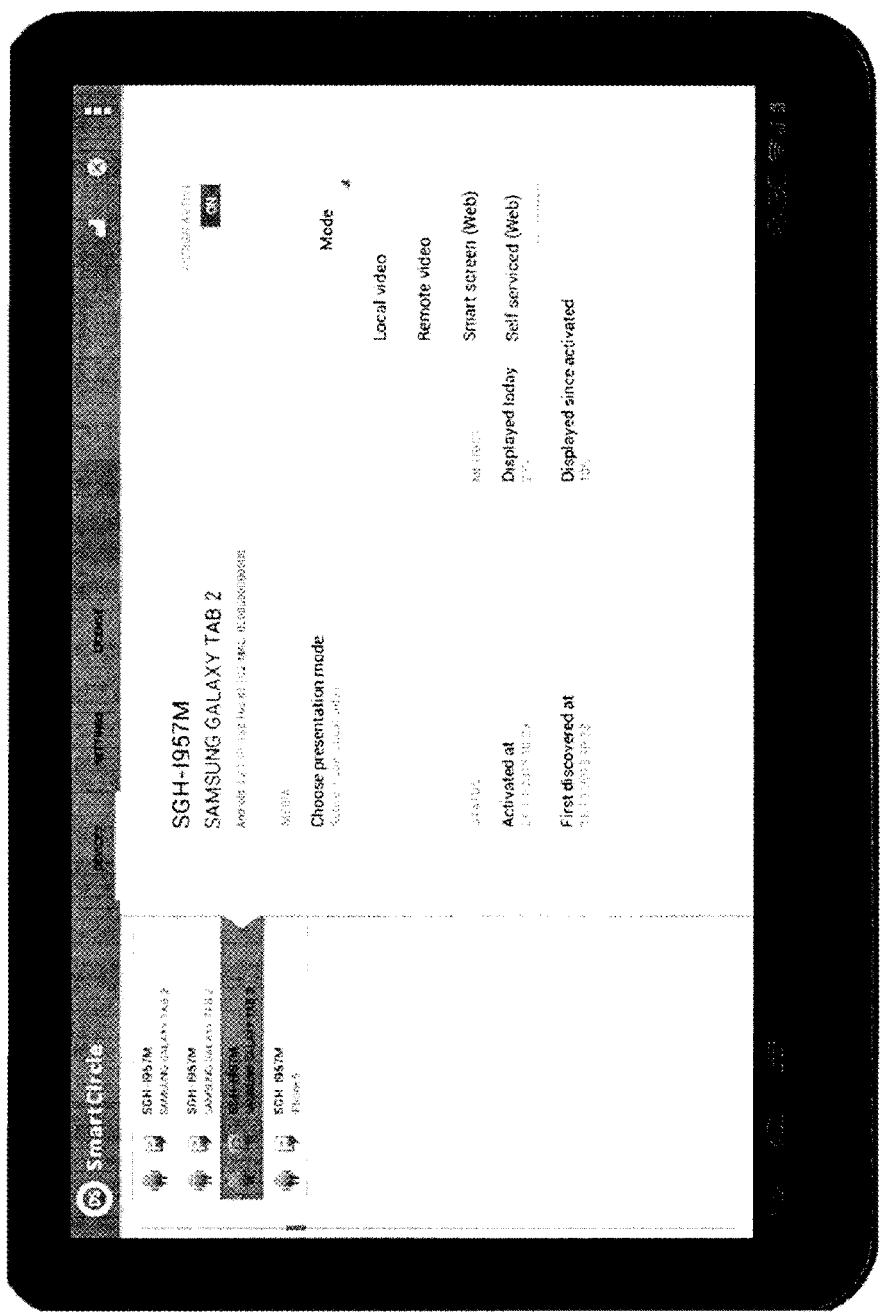
FIG. 34 shows an interface to set up the media which is presented by a digital media or digital signage (DS) app.

As shown in FIG. 34, the DS app may preferably presents an interface to set up the media. A list of eligible devices may preferably be presented (for example, on the left side of the interface), preferably highlighting any selected devices. The name, IP address, and/or operating system of the device also may preferably be presented (for example, on the right side of the interface). Preferably, one or more media choices may also be presented, such as, for example, local selectable media (e.g., playing selectable media on the device), remote selectable media (e.g., playing selectable media from another device), smart screen media (e.g., via a predetermined, supplied, accessed and/or generated trigger URL), and/or self serviced media (e.g., via a manager/client trigger URL). One or more status indicators and/or metrics for a selected device may preferably also be shown, including: activation date/time (e.g., start date/time of current session); first discovered date/time (e.g., date/time selectable media began playing); displayed today (e.g., time media played as a percentage of time elapsed on the specific date); and/or displayed since first discovered (e.g., time media played as a percentage of time elapsed since selectable media uploaded).

Figure 35:
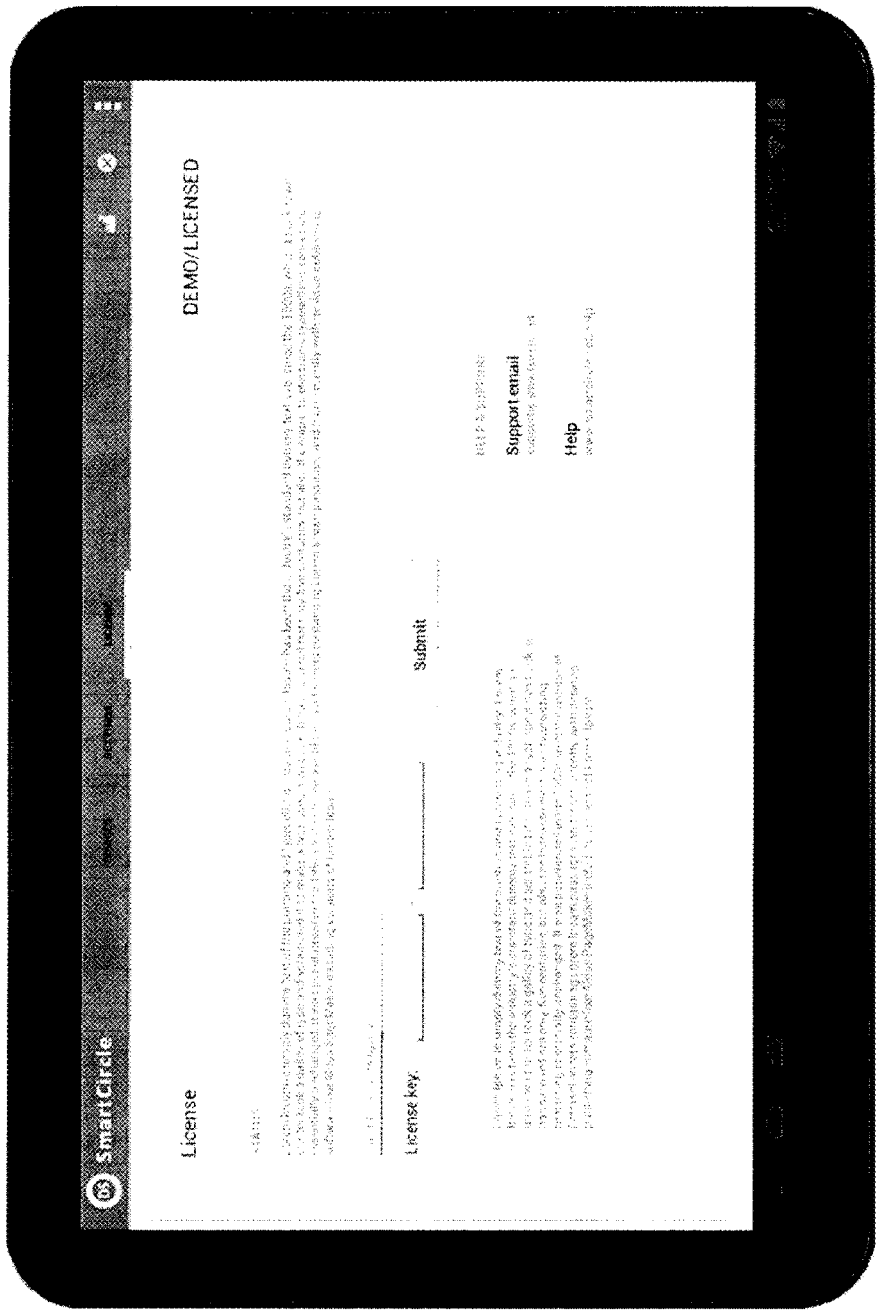
FIG. 35 shows a license screen which is provided as part of the DS app where users may login.

FIG. 35 shows a license screen which may preferably be provided as part of the DS app, where users may preferably login. License key flow is described elsewhere herein and such description may preferably be adapted, mutatis mutandis, in conjunction with license keys in the context of the DS app.

Figure 36:
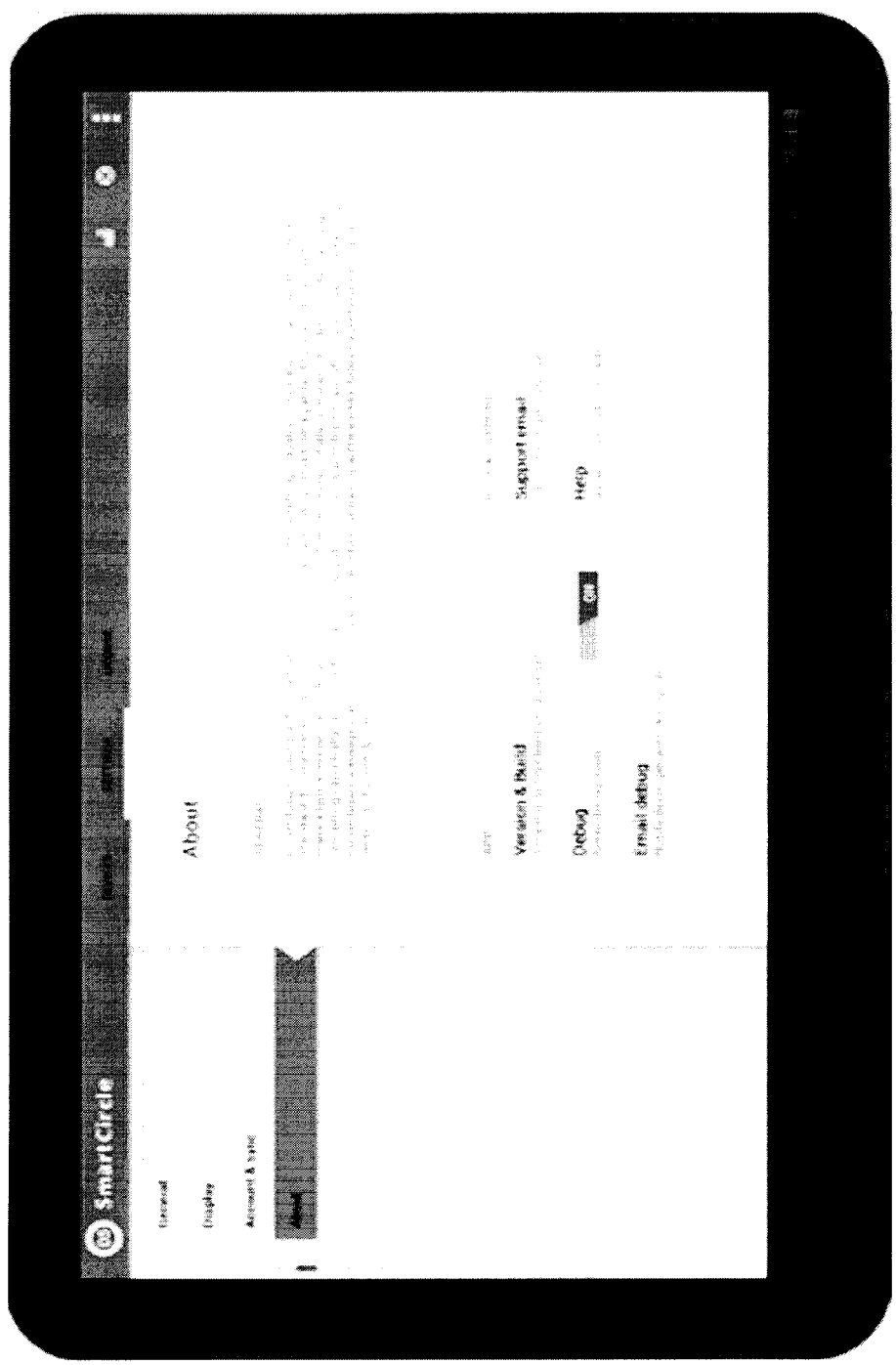
FIG. 36 shows an about screen of the DS app.

An about screen of the DS app is shown in FIG. 36. It may preferably present a description of the DS application, and/or provide programmers and admin users of the DS app (e.g., upon entry of a restricted access code or otherwise) with one or more tools to assist in any ongoing development, maintenance, and/or administration of the DS app which may be necessary and/or desired.

Figure 37:
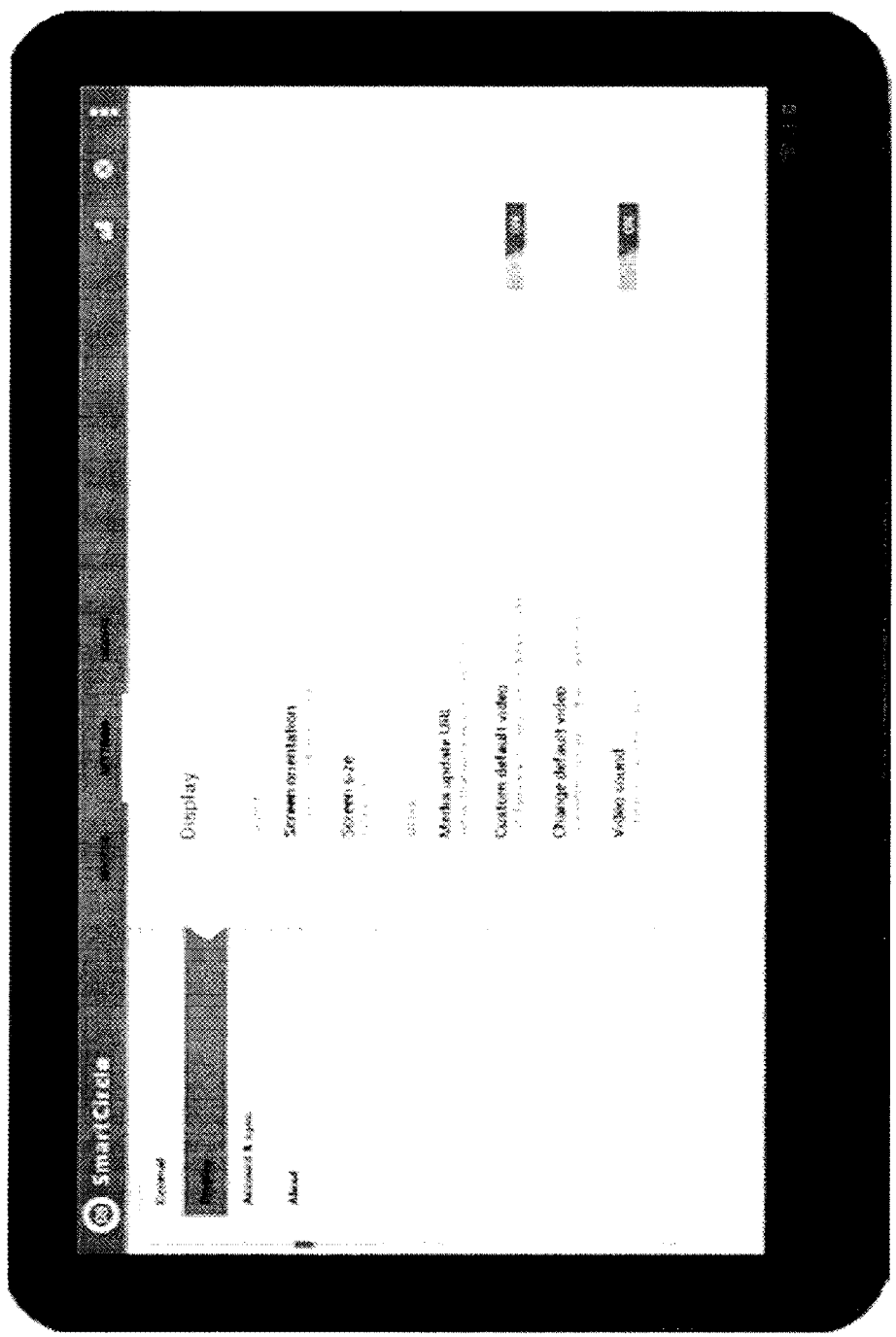
FIG. 37 shows a display screen of the DS app that enables users to adjust the way the media is displayed on the device.

FIG. 37 shows a display screen of the DS app which may preferably enable users to adjust the way the media is displayed on the device. According to one aspect of the invention, users may preferably select 'Screen Orientation' (e.g., to set screen orientation to portfolio or landscape), 'Screen Size' (e.g., to adjust resolution to fit screen), 'Media update URL' (e.g., to set the URL for selectable media upload), 'Custom Default Selectable media' (e.g., to set the custom default selectable media), 'Change Default Selectable media' (e.g., to change the default selectable media), and/or 'Selectable media Sound' (e.g., to turn selectable media sound on or off), if/as desired.

Figure 38:
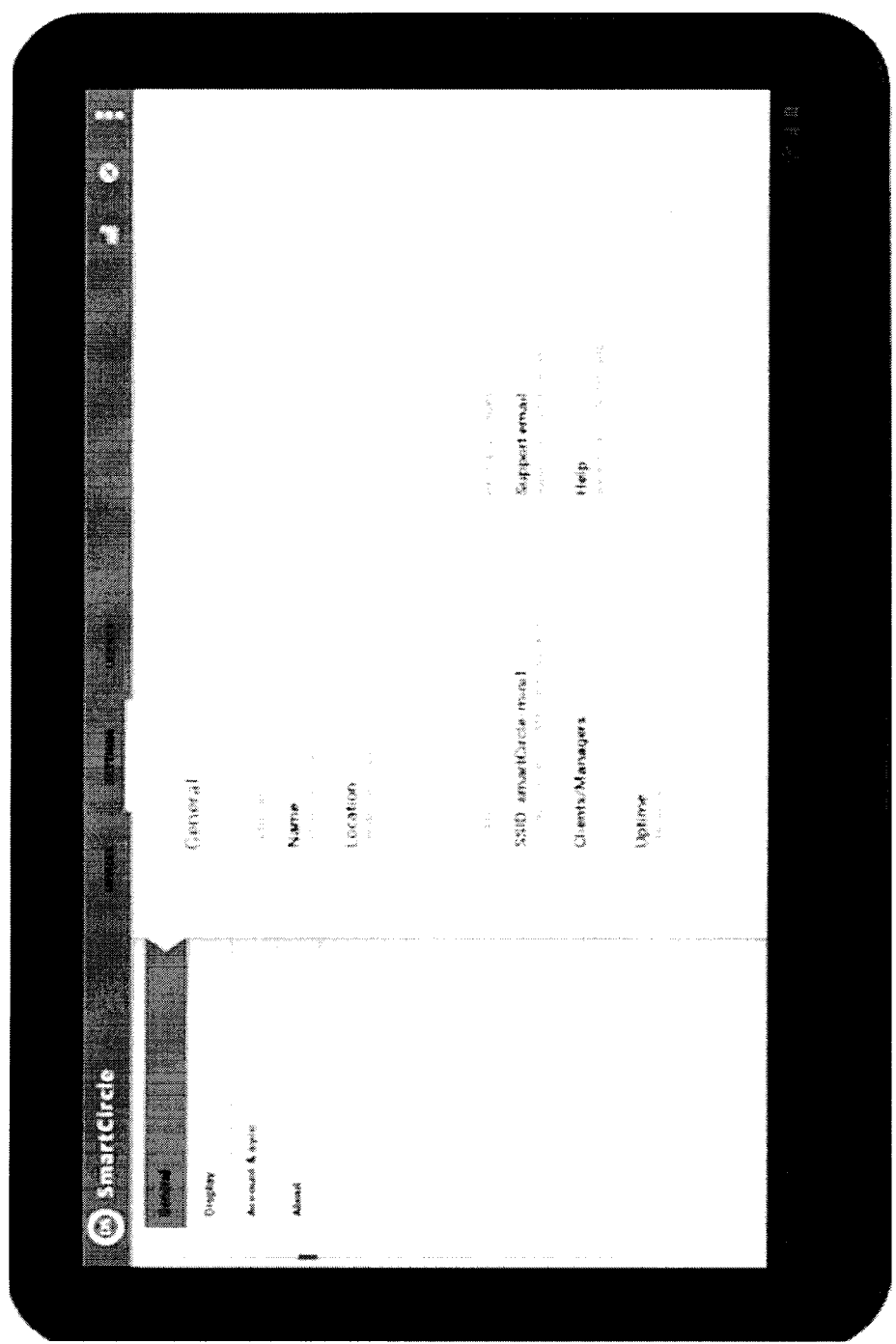
FIG. 38 shows a general settings display screen of the DS app that enables users to select information and/or to obtain information about the device and/or location.

FIG. 38 shows a general settings display screen of the DS app, which may preferably enables users to select information and/or to obtain information about the device and/or location. For example, according to one aspect of the invention, users may preferably select 'Name' (e.g., to enter the name of the device) and/or 'Location' (e.g., to enter the name of the location), if/as desired. Other information which may preferably be obtained from this screen may include: network status information, the number of client (display) apps and/or manager apps, and/or uptime of the DS app in hours. The general settings display screen shown in FIG. 38 may preferably also afford users with help and support, including email and URL support, concerning the DS app.

Figure 39:
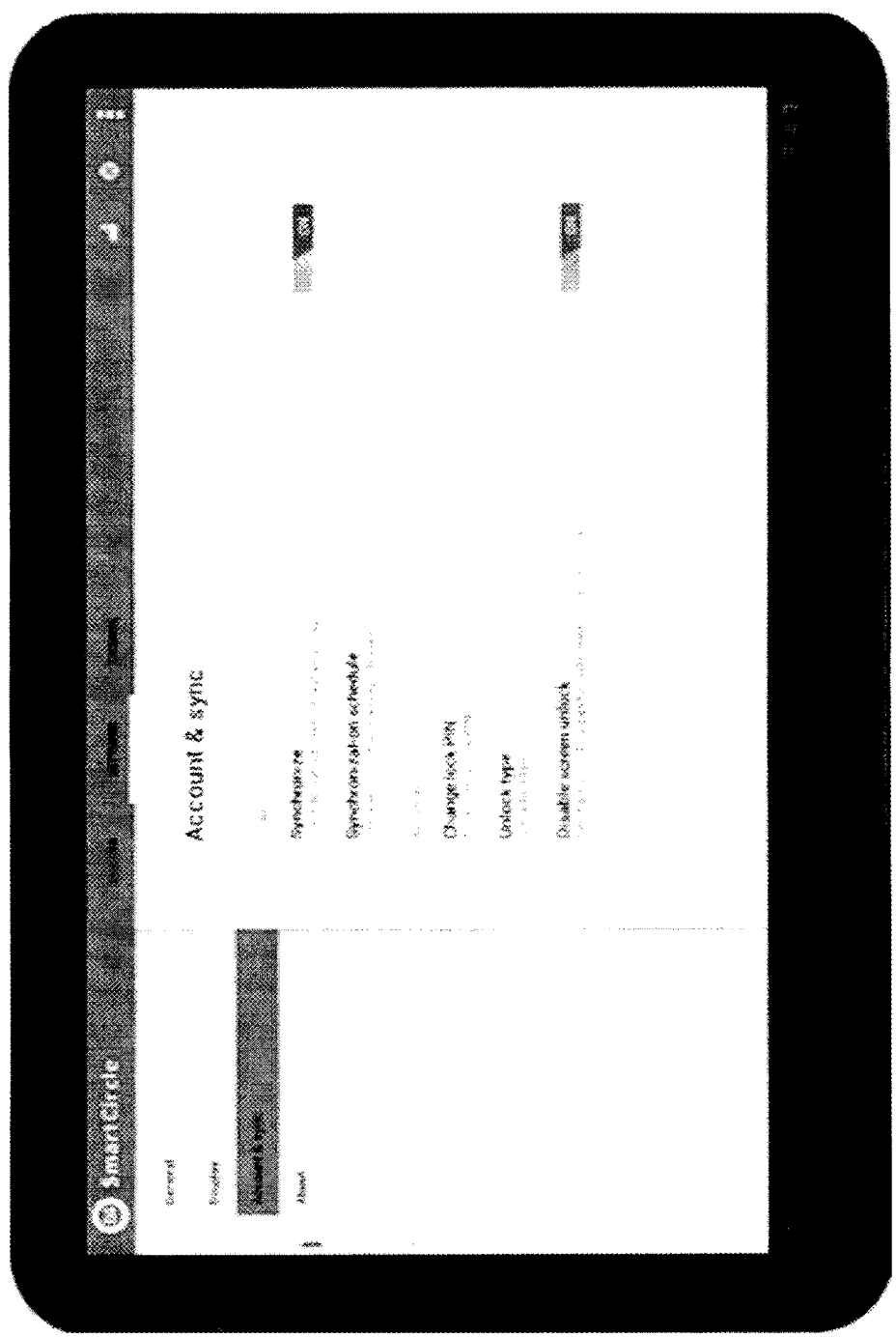
FIG. 39 shows an account and synchronization screen of the DS app that enables users to synchronize one or more of the devices within the network

The DS app may preferably also include an account and synchronization screen, as shown in FIG. 39, which may preferably enable users to synchronize one or more of the devices within the network. Users may preferably select 'Synchronize' (e.g., if devices will perform an automatic sync with each other), and/or 'Synchronization Schedule' (e.g., to set how often and/or when the sync may preferably occur), if/as desired. This page also may preferably include access to change account information, and users may preferably select 'Change Lock PIN' (e.g., to change the PIN on this application), 'Unlock type' (e.g., to set the unlock type), and/or 'Disable screen unlock' (e.g., to disable the screen unlock function).

According to one aspect of the invention, there may preferably be one or more (and more preferably five) steps to license flow: (1) account set-up, (2) location set-up, (3) manager set-up and registration, (4) application download, and/or (5) Wi-Fi router set-up.

The license flow may preferably begin with account set-up and/or the granting of location licenses. This may preferably be a manual process led by a trained representative of the security system and/or DS app platform. Key information which may preferably be provided may include: information for billing, name of key client representative, and/or location information (e.g., number of locations, address of locations, and/or key manager of each location). This information may preferably be gathered, entered and/or stored in the license server, finance database, and/or remote databases. Thereafter, a welcome email may preferably be sent to the key client representative and/or each location key manager.

The next step may preferably be to 'set-up' the locations. In some embodiments of the invention, a group of locations may preferably have a central billing reference, with payment to be collected for each location in the group. Locations may preferably be controlled through a location key, which may preferably be generated and/or stored on the licensing server and/or remote databases. It may preferably be possible to have multiple locations at same address, and/or one location at multiple addresses, depending on needs and/or preferences of the clients and/or managers. Each location may preferably be allowed to have one configuration only.

Location keys may preferably not be accessible through the app and/or the web. Location Keys may preferably be stored through email, and/or supplied directly by the vendor if needed. The location set-up may preferably be a manual process, though it could additionally and/or instead be at least partially automated. Preferably, the key location manager may have a configurations key and understand: the manager app fixture and/or device display structure; one or more of the steps to select devices and/or place them into fixtures; and/or the configuration options (e.g., alarm triggers). The key manager from each location may preferably facilitate configuration with instructions for a security system administrator, who may preferably enter this information into the security system license server and/or remote databases. This information may preferable include: location name; address; how many fixtures; how many displays per fixture; mount solution; and/or charging solution. The key location managers may preferably hold the location key, such as may preferably be receive and stored from an email.

Preferably, soon after the locations are properly configured, an email may be sent to each key location manager with the license key and/or the URL for download.

In the manager set-up and registration process, each manager may preferably be registered on the license server and/or remote database. This registration may preferably ensure and/or facilitate personal accountability for action taken with every manager device. Each manager may preferably be set-up with one of two options: configuration manager (e.g., admin controls over the security system), and/or guard (e.g., no admin controls over the security system). The key location manager may preferably be automatically set-up with the configuration manager option and/or may preferably have the ability to add/delete other managers from the location. According to some embodiments of the invention, adding and/or deleting managers may preferably be achieved via an email or other communication with the security system vendor's administration. The configuration manager option may preferably provide authority to configure the location, and/or to change the configuration of the location. The guard option may preferably possess many, and perhaps all, of the same features as the configuration manager option, except without an ability to change the configuration, and/or to add/delete other managers. Each manager may preferably require a license key, and a manager key. According to some embodiment of the invention, there may preferably be no area on the interface to enter the manager key.

In application download, manager and display applications for various different operating systems (e.g., Android, Apple, Blackberry, Windows) may preferably be available for download via URL and/or proprietary (e.g., B2B) app stores. Standard device app download procedures may preferably be followed to download the applications. Preferably, every Display device may be provided with the display app.

In Wi-Fi router set-up, it is worth noting the security system may preferably operate on a network with its own router. This network may preferably be afforded access to the Internet, e.g., for license key validation. Standard set-up procedures for this router may preferably be performed.

The device management system, method and computer readable medium according to the present invention preferably manages cross platform devices within the same location utilizing an IP (wired or wireless) network/intranet, manager devices, controller devices and display devices. Unlike other mobile device management systems that connect to individual devices from a remote location, the device management system, method and computer readable medium according to the present invention preferably manages a group (in the same WLAN) of devices by one or more managers and then connects the group to a remote location. That group of devices preferably uses the same IP protocol with a peer-to-peer architecture.

The device management system, method and computer readable medium according to the present invention preferably monitors device sensors to detect human activity such as lift, touch, and swipe then uses those readings to trigger media on the same device and/or other remote devices with the device management system according to the present invention installed utilizing the same WLAN or intranet. Media can be different for all detected activity such as lift, touch and swipe.

The device management system, method and computer readable medium according to the present invention preferably detects lift, touch and interaction of human activity to collect metrics by the sensors in these devices through an installed application on that device. Then, the device management system, method and computer readable medium according to the present invention preferably saves all customer interaction activity to the database.

The device management system, method and computer readable medium according to the present invention preferably uses the sensors in the display devices to accurately position that device within a specific location which would provide remote or local confirmation of a pre-determined floor plan or layout within that location.

The device management system, method and computer readable medium according to the present invention preferably identifies the specific location of devices within the group using a combination of manager, controller, display applications and the control of the devices charging.

Naturally, in view of the teachings and disclosures herein, persons having ordinary skill in the art may appreciate that alternate designs and/or embodiments of the invention may be possible (e.g., with substitution of one or more apps, modules, components and/or features for others, with alternate configurations of apps, modules, components and/or features, etc). Among other things, it should be appreciated that, although some of the apps, modules, components, features, relations, and/or configurations of the devices, systems, methods and computer readable media according to the invention are not specifically referenced in association with one another, they may be used, and/or adapted for use, in association therewith.

The device, system, method and/or computer readable medium according to the invention are contemplated for use around the world, in association with mobile communications devices. The invention, however, is not so limited. Other modifications and alterations may be used in the design, manufacture, and/or implementation of other embodiments according to the present invention without departing from the spirit and scope of the invention, which is limited only by the claims hereof and of any regular patent applications claiming priority herefrom.

What is claimed is:

1. A system for managing one or more display devices including one or more mobile devices at an on-site location, using one or more manager devices at the on-site location and/or remotely located, wherein the system comprises:
　(a) one or more manager subsystems, each for execution by a respective one of the manager devices;
　(b) one or more display subsystems, each for execution by a respective one of the display devices, wherein a two-way wireless communication link is established between the display subsystems and the manager subsystems;
　　wherein the display subsystems report to the manager subsystems one or more predetermined alarm conditions detected for at least a first one of the mobile devices, and the manager subsystems enable one or more predetermined alarm events to be triggered within the display devices;

wherein the display subsystems restrict access to one or more applications or settings on the mobile devices, or to one or more connected networks;

wherein the manager subsystems and the display subsystems together enable deletion of user-generated audio, visual or audiovisual media from the mobile devices;

wherein, when at least a second one of the mobile devices is at idle or when user activity is detected at said second one of the mobile devices, the display subsystems present predetermined audio, visual or audiovisual media from the display devices;

wherein the manager subsystems: determine which of the mobile devices are powering; present an alert when said one or more of the mobile devices are not powering; and regulate power going to said one or more of the mobile devices; and wherein the manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

2. A system according to claim 1, wherein the communication link is a scalable and peer-to-peer communication link between the display subsystems and the manager subsystems, and/or between the display subsystems executed by two or more of the display devices.

3. A system according to claim 1, wherein the predetermined alarm conditions comprise one or more of the following: SIM card removal; other theft attempts; headphones removed; power cable disconnection; non-powering condition; other charging issues; and loss of communication link.

4. A system according to claim 1, wherein the predetermined alarm events comprise one or more of the following: presentation of predetermined audio, visual or audiovisual alarm events from said first one of the mobile devices and/or from at least one of the display devices nearby; capture and transmission of a camera or microphone signal from said first one of the mobile devices to the manager subsystem; and capture and transmission of geo-location information from said first one of the mobile devices to the manager subsystem.

5. A system according to claim 1, wherein the manager subsystems enable the predetermined alarm events to be triggered within the display devices after a predetermined delay or timing.

6. A system according to claim 1, wherein the manager subsystems enable the predetermined alarm events to be triggered within at least one of the manager devices.

7. A system according to claim 1, wherein the manager subsystems enable the predetermined alarm events to be triggered by email or SMS message.

8. A system according to claim 1, wherein access to the manager subsystems is restricted to authorized personnel only.

9. A system according to claim 1, further comprising one or more remote databases; wherein the metrics and data associated with the mobile devices at the on-site location are stored in the remote databases.

10. A system according to claim 9, wherein the manager subsystems afford selective access to the metrics and data associated with the mobile devices at the on-site location from the remote databases.

11. A system according to claim 1, further comprising one or more remote databases; wherein access to the manager subsystems requires a license key to be validated with reference to the remote databases.

12. A system according to claim 1, wherein the display devices present the predetermined audio, visual or audiovisual media when the communication link is established between the display subsystems of said display devices and at least one of the manager subsystems.

13. A system according to any one of claims 1 to 12, wherein when said user activity is detected at said second one of the mobile devices, the display subsystems stop presentation of said predetermined audio, visual or audiovisual media from said second one of the mobile devices, and enable said second one of the mobile devices for use.

14. A system according to claim 1, wherein said user activity comprises one or more of the following: user engagement of said second one of the mobile devices; and lifting or movement of said second one of the mobile devices.

15. A system according to claim 1, wherein the display subsystems transmit a camera or microphone signal from said second one of the mobile devices to the manager subsystems when said user activity is detected.

16. A system according to claim 1, wherein the predetermined audio, visual or audiovisual media comprises one or more of the following: a camera or microphone signal from said second one of the mobile devices; marketing, advertising or other promotional media; and other media relevant to said user activity.

17. A system according to claim 1, wherein the manager subsystems and the display subsystems together enable automatic deletion of said user-generated audio, visual or audiovisual media from the mobile devices at regular intervals.

18. A system according to claim 1, wherein the metrics and data associated with the mobile devices at the on-site location additionally concern one or more of the following: activation dates and times; first discovered dates and times; displayed today metrics and data; and displayed since first discovered metrics and data.

19. A system according to claim 1, further comprising one or more remote databases; wherein the display subsystems and the manager subsystems together use sensors in the mobile devices to accurately determine, and store in the remote databases, specific positions of the mobile devices at the on-site location; and wherein the remote databases afford the manager subsystems selective access to the specific positions of the mobile devices.

20. A system according to claim 1, wherein the manager subsystems enable selective termination of the predetermined alarm events triggered within the display devices.

21. A method for managing one or more display devices including one or more mobile devices at an on-site location, using one or more manager devices at the on-site location and/or remotely located, wherein the method comprises:

(c) a manager step of providing one or more manager subsystems, each for execution by a respective one of the manager devices;

(d) a display step of providing one or more display subsystems, each for execution by a respective one of the display devices, wherein a two-way wireless communication link is established between the display subsystems and the manager subsystems;

wherein the display subsystems report to the manager subsystems one or more predetermined alarm conditions detected for at least a first one of the mobile devices, and the manager subsystems enable one or more predetermined alarm events to be triggered within the display devices;

wherein the display subsystems restrict access to one or more applications or settings on the mobile devices, or to one or more connected networks;

wherein the manager subsystems and the display subsystems together enable deletion of user-generated audio, visual or audiovisual media from the mobile devices;

wherein, when at least a second one of the mobile devices is at idle or when user activity is detected at said second one of the mobile devices, the display subsystems present predetermined audio, visual or audiovisual media from the display devices;

wherein the manager subsystems: determine which of the mobile devices are powering; present an alert when said one or more of the mobile devices are not powering; and regulate power going to said one or more of the mobile devices; and wherein the manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

22. A method according to claim 21, wherein the communication link is a scalable and peer-to-peer communication link between the display subsystems and the manager subsystems, and/or between the display subsystems executed by two or more of the display devices.

23. A method according to claim 21, wherein the predetermined alarm conditions comprise one or more of the following: SIM card removal; other theft attempts; headphones removed; power cable disconnection; non-powering condition; other charging issues; and loss of communication link.

24. A method according to claim 21, wherein the predetermined alarm events comprise one or more of the following: presentation of predetermined audio, visual or audiovisual alarm events from said first one of the mobile devices and/or from at least one of the display devices nearby; capture and transmission of a camera or microphone signal from said first one of the mobile devices to the manager subsystem; and capture and transmission of geo-location information from said first one of the mobile devices to the manager subsystem.

25. A method according to claim 21, wherein the manager subsystems enable the predetermined alarm events to be triggered within the display devices after a predetermined delay or timing.

26. A method according to claim 21, wherein the manager subsystems enable the predetermined alarm events to be triggered within at least one of the manager devices.

27. A method according to claim 21, wherein the manager subsystems enable the predetermined alarm events to be triggered by email or SMS message.

28. A method according to claim 21, wherein access to the manager subsystems is restricted to authorized personnel only.

29. A method according to claim 21, further comprising a database step of providing one or more remote databases; wherein the metrics and data associated with the mobile devices at the on-site location are stored in the remote databases.

30. A method according to claim 29, wherein the manager subsystems afford selective access to the metrics and data associated with the mobile devices at the on-site location from the remote databases.

31. A method according to claim 21, further comprising a database step of providing one or more remote databases; wherein access to the manager subsystems requires a license key to be validated with reference to the remote databases.

32. A method according to claim 21, wherein the display devices present the predetermined audio, visual or audiovisual media when the communication link is established between the display subsystems of said display devices and at least one of the manager subsystems.

33. A method according to claim 21, wherein when said user activity is detected at said second one of the mobile devices, the display subsystems stop presentation of said predetermined audio, visual or audiovisual media from said second one of the mobile devices, and enable said second one of the mobile devices for use.

34. A method according to claim 21, wherein said user activity comprises one or more of the following: user engagement of said second one of the mobile devices; and lifting or movement of said second one of the mobile devices.

35. A method according to claim 21, wherein the display subsystems transmits a camera or microphone signal from said second one of the mobile devices to the manager subsystems when said user activity is detected.

36. A method according to claim 21, wherein the predetermined audio, visual or audiovisual media comprises one or more of the following: a camera or microphone signal from said second one of the mobile devices; marketing, advertising or other promotional media; and other media relevant to said user activity.

37. A method according to claim 21, wherein the manager subsystems and the display subsystems together enable automatic deletion of said user-generated audio, visual or audiovisual media from the mobile devices at regular intervals.

38. A method according to claim 21, wherein the metrics and data associated with the mobile devices at the on-site location additionally concern one or more of the following: activation dates and times; first discovered dates and times; displayed today metrics and data; and displayed since first discovered metrics and data.

39. A method according to claim 21, further comprising a database step of providing one or more remote databases; wherein the display subsystems and the manager subsystems together use sensors in the mobile devices to accurately determine, and store in the remote databases, specific positions of the mobile devices at the on-site location; and wherein the remote databases afford the manager subsystems selective access to the specific positions of the mobile devices.

40. A method according to claim 21, wherein the manager subsystems enable selective termination of the predetermined alarm events triggered within the display devices.

41. A non-transitory computer readable medium for managing one or more display devices having processors and including one or more mobile devices at an on-site location, using one or more manager devices at the on-site location and/or remotely located, for use with one or more manager subsystems each for execution by a respective one of the manager devices, with the computer readable medium comprising executable instructions which are physically stored thereon and which, upon execution, encode the processors to perform:

a display step of providing one or more display subsystems, each for execution by a respective one of the display devices, wherein a two-way wireless communication link is established between the display subsystems and the manager subsystems;

wherein the display subsystems report to the manager subsystems one or more predetermined alarm conditions detected for at least a first one of the mobile devices, and the manager subsystems enable one or more predetermined alarm events to be triggered within the display devices;

wherein the display subsystems restrict access to one or more applications or settings on the mobile devices, or to one or more connected networks;

wherein the display subsystems, together with the manager subsystems, enable deletion of user-generated audio, visual or audiovisual media from the mobile devices;

wherein, when at least a second one of the mobile devices is at idle or when user activity is detected at said second one of the mobile devices, the display subsystems present predetermined audio, visual or audiovisual media from the display devices;

wherein the display subsystems enable the manager subsystems to:

determine which of the mobile devices are powering; present an alert when said one or more of the mobile devices are not powering; and regulate power going to said one or more of the mobile devices; and collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

42. A non-transitory computer readable medium for managing one or more display devices including one or more mobile devices at an on-site location, using one or more manager devices having processors at the on-site location and/or remotely located, for use with one or more display subsystems each for execution by a respective one of the display devices, with the computer readable medium comprising executable instructions which are physically stored thereon and which, upon execution, encode the processors to perform:

a manager step of providing one or more manager subsystems, each for execution by a respective one of the manager devices, wherein a two-way wireless communication link is established between the display subsystems and the manager subsystems;

wherein the manager subsystem enable the display subsystems to:

report to the manager subsystems one or more predetermined alarm conditions detected for at least a first one of the mobile devices, and the manager subsystems enable one or more predetermined alarm events to be triggered within the display devices;

restrict access to one or more applications or settings on the mobile devices, or to one or more connected networks;

when at least a second one of the mobile devices is at idle or when user activity is detected at said second one of the mobile devices, present predetermined audio, visual or audiovisual media from the display devices;

wherein the manager subsystems, together with the display subsystems, enable deletion of user-generated audio, visual or audiovisual media from the mobile devices;

wherein the manager subsystems: determine which of the mobile devices are powering; present an alert when said one or more of the mobile devices are not powering; and regulate power going to said one or more of the mobile devices; and wherein the manager subsystems collect metrics and data, associated with said one or more of the mobile devices at the on-site location, concerning one or more of the following: the user activity detected, the alarm conditions detected, the alarm events triggered, the user-generated audio, visual or audiovisual media, the predetermined audio, visual or audiovisual media presented from the display devices, and the powering of said one or more of the mobile devices.

\* \* \* \* \*